(12) United States Patent
Yamaguchi et al.

(10) Patent No.: US 8,635,453 B2
(45) Date of Patent: Jan. 21, 2014

(54) CONTROLLER TO BE INCORPORATED IN STORAGE MEDIUM DEVICE, STORAGE MEDIUM DEVICE, SYSTEM FOR MANUFACTURING STORAGE MEDIUM DEVICE, AND METHOD FOR MANUFACTURING STORAGE MEDIUM DEVICE

(75) Inventors: Takahiro Yamaguchi, Osaka (JP); Masaya Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 13/038,824

(22) Filed: Mar. 2, 2011

(65) Prior Publication Data

US 2011/0219232 A1 Sep. 8, 2011

Related U.S. Application Data

(60) Provisional application No. 61/309,960, filed on Mar. 3, 2010.

(51) Int. Cl.
*G06F 21/00* (2013.01)

(52) U.S. Cl.
USPC .............. 713/169; 713/179; 380/279; 726/27

(58) Field of Classification Search
None
See application file for complete search history.

(56) References Cited

U.S. PATENT DOCUMENTS

| 7,882,545 B2* | 2/2011 | Adiletta et al. .................... 726/4 |
| 7,907,734 B2* | 3/2011 | Nishida et al. ................ 380/277 |
| 2005/0066167 A1* | 3/2005 | Asano et al. .................. 713/165 |
| 2010/0119069 A1* | 5/2010 | Kamikura et al. ............ 380/255 |
| 2010/0122079 A1 | 5/2010 | Nakano et al. |
| 2010/0189265 A1 | 7/2010 | Ito et al. |
| 2010/0275036 A1* | 10/2010 | Harada et al. .................. 713/189 |
| 2011/0004891 A1* | 1/2011 | Yamaoka et al. ............. 720/718 |

FOREIGN PATENT DOCUMENTS

| JP | 5-257816 | 10/1993 |
| JP | 2004-139242 | 5/2004 |
| JP | 2005-115825 | 4/2005 |
| JP | 2005-266952 | 9/2005 |
| WO | 2009/028137 | 3/2009 |
| WO | 2009/044508 | 4/2009 |

OTHER PUBLICATIONS

International Search Report issued May 31, 2011 in International (PCT) Application No. PCT/JP2011/001229.

* cited by examiner

*Primary Examiner* — Hadi Armouche
(74) *Attorney, Agent, or Firm* — Wenderoth, Lind & Ponack, L.L.P.

(57) ABSTRACT

Provided is a controller capable of preventing card makers from conducting unauthorized acts. The controller includes: a controller key storage unit configured to hold a controller key that has been embedded by a controller manufacturing device in advance; a decryption unit configured to receive encrypted media key information that has been generated by a key issuance center that is authorized and to decrypt the received encrypted media key by using the controller key, the encrypted key information generated through encryption of key information with use of the controller key; and an encryption unit configured to encrypt the decrypted media key again by using an individual key that is unique to the controller.

14 Claims, 20 Drawing Sheets

CONTROLLER TO BE INCORPORATED IN STORAGE MEDIUM DEVICE, STORAGE MEDIUM DEVICE, SYSTEM FOR MANUFACTURING STORAGE MEDIUM DEVICE, AND METHOD FOR MANUFACTURING STORAGE MEDIUM DEVICE

This application claims benefit to U.S. provisional application No. 61/309,960 filed on Mar. 3, 2010.

TECHNICAL FIELD

The present invention relates to a controller to be incorporated into a storage medium device that stores digitally-distributed contents, a storage medium device, a system for manufacturing a storage medium device, and a method for manufacturing a storage medium device. In particular, the present invention relates to a technology for protecting copyrights on digital contents.

BACKGROUND ART

Digital contents distribution services are becoming popular. In the services, digital contents being digital works such as music and movies are digitally distributed to a recording device (e.g. a KIOSK terminal and a personal computer) over a network, the distributed digital contents are stored in a storage medium device by using the recording device, and the stored digital contents are played back by a playback device (e.g. a music player and a portable terminal for displaying videos).

In this case, in order to protect rights of copyright owners of the digital contents, technology is required to prevent the digital contents having been stored in the storage medium device from being copied to another storage medium device and played back.

According to Patent Literature 1, in a storage medium device, a medium unique number that is unique to the storage medium and unrewritable is stored. A licenser side generates a medium unique key based on the medium unique number stored in the storage medium, encrypts a decryption key for decrypting encrypted data with the generated medium unique key, and writes the encrypted decryption key to the storage medium as license information. A user side reads the medium unique number from the storage medium, generates the medium unique key based on the read medium unique number, generates the decryption key by decrypting the encrypted decryption key being the license information with the generated medium unique key, and generates plaintext digital data by decrypting the encrypted data with the generated decryption key.

According to this technology, even if an attempt is made to copy the encrypted data and the license information stored in the authorized storage medium device to the other unauthorized storage medium device, and decrypt the encrypted data copied to the unauthorized storage medium device, the copied encrypted data cannot be properly decrypted. This is because, since the medium unique number stored in the authorized storage medium device cannot be copied to the unauthorized storage medium device, the medium unique number stored in the authorized storage medium device cannot be obtained from the unauthorized storage medium device, and thus the encrypted decryption key being the license information cannot be properly decrypted. As a result, it is impossible to properly decrypt the encrypted data.

Meanwhile, card makers that sell storage medium devices purchase parts such as controllers and flash memories from parts makers, and put them together to manufacture storage medium devices. Then, the card makers sell the storage medium devices after embedding the information such as the medium unique information and the medium unique key described above, which is required for the copyright protection on the contents, into the assembled storage medium devices. Thus, the uniqueness and the security of the medium unique information and the medium unique key are ensured only by the card makers.

CITATION LIST

Patent Literature

[Patent Literature 1] Japanese Patent Application Publication No. 05-257816.

SUMMARY OF INVENTION

Technical Problem

Thus, there are cases where copyrights on digital contents cannot be protected when a card maker illicitly stores the same medium unique information and the same medium unique key into a plurality of memory cards, or stores the medium unique information and the medium unique key under an improper condition where they are easily tampered with, even though the values thereof are not the same.

The present invention is made in view of the above problems. The aim of the present invention is to provide a controller, a storage medium device, a system for manufacturing a storage medium device, and a method for manufacturing a storage medium device, which are capable of preventing improper acts by card makers and protecting copyrights on contents.

Solution to Problem

To solve the problem, the present invention provides a controller to be incorporated in a storage medium device and controlling access to the storage medium device, the controller comprising: a holding unit configured to hold a controller key generated by a controller manufacturing device; a receiving unit configured to receive encrypted key information generated by a key distribution center that is authorized, the encrypted key information generated through encryption of key information with use of the controller key, the key information used for protecting data stored on the storage medium device; and a conversion unit configured to perform conversion on the encrypted key information by using unique information of the controller, thereby generating individually-converted key information.

Advantageous Effects of Invention

With the stated structure, the controller receives the encrypted key information that has been encrypted by using the controller key held by the holding unit. Thus, there is no risk of outputting unencrypted key information to outside the controller. Therefore, it is impossible for card makers, which assemble storage medium devices, to conduct unauthorized acts, such as embedding same key information into a plurality of recording storage medium devices.

In the meanwhile, controllers in the same manufacturing lot are generally given the same controller key to be embedded therein. Thus, simply encrypting the key information by using the controller key is not enough to protect the copyrights of contents, because it is possible to acquire the key information embedded in a storage medium device by using another storage medium device including a controller that has been manufactured in the same manufacturing lot.

Thus, the conversion unit converts the encrypted key information by using information that is unique to the controller. As a result, it becomes impossible to acquire the key information by using another storage medium device including a controller that has been manufactured in the same manufacturing lot. Therefore the present invention is capable of surely protecting the copyrights of contents.

DESCRIPTION OF EMBODIMENTS

Figure 1:
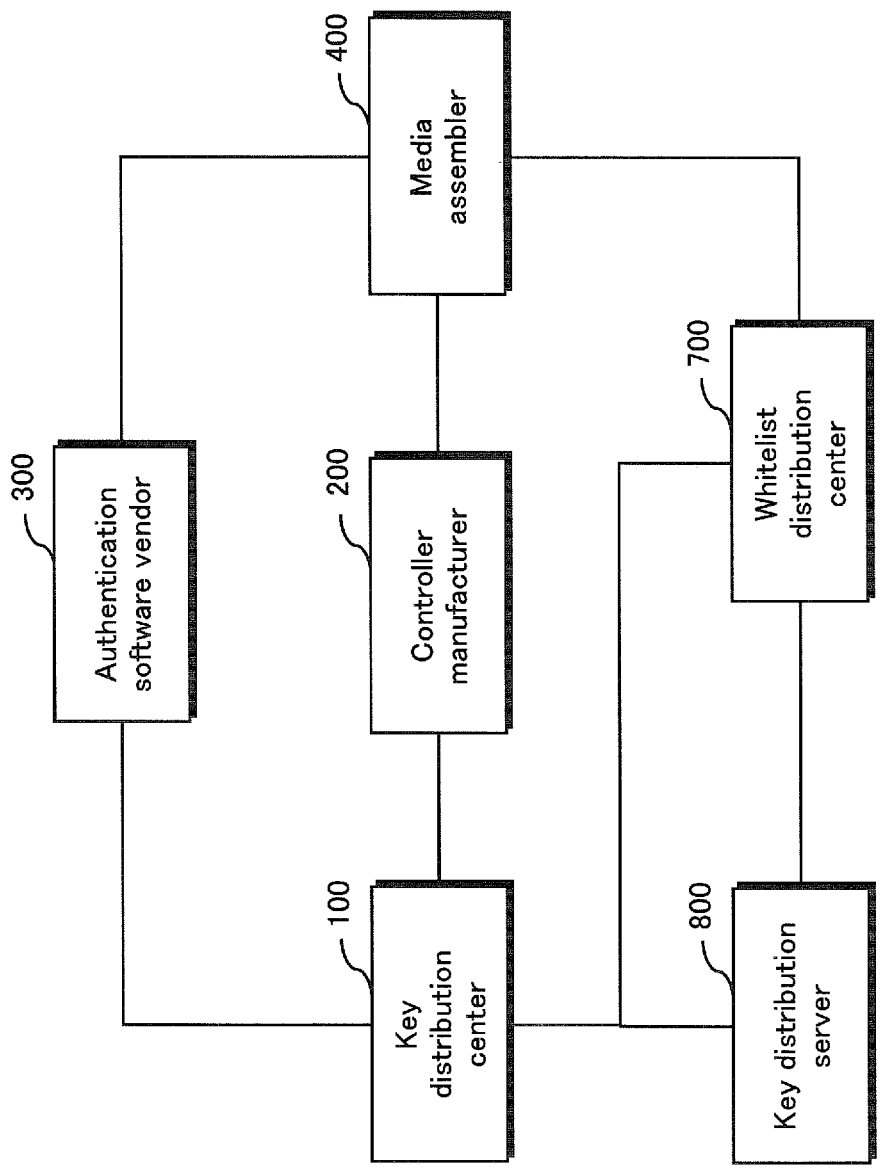
FIG. 1 shows overall configuration of a key distribution center, a controller manufacturer, an authentication software vendor, a media assembler, a whitelist distribution center, and a key distribution server in Embodiment 1 of the present invention.

A first aspect of the present invention is a controller to be incorporated in a storage medium device and controlling access to the storage medium device, the controller comprising: a holding unit configured to hold a controller key generated by a controller manufacturing device; a receiving unit configured to receive encrypted key information generated by a key distribution center that is authorized, the encrypted key information generated through encryption of key information with use of the controller key, the key information used for protecting data stored on the storage medium device; and a conversion unit configured to perform conversion on the encrypted key information by using unique information of the controller, thereby generating individually-converted key information.

In a second aspect of the present invention pertaining to the controller, the conversion unit may include: a decryption unit configured to decrypt the encrypted key information by using the controller key held by the holding unit, thereby generating the key information; and an encryption unit configured to encrypt the key information by using the unique information, thereby generating the individually-converted key information.

With the stated structure, it is impossible for each controller to acquire the key information embedded in other storage medium devices even if a plurality of controllers manufactured in the same manufacturing lot have the same controller key. Therefore, the present invention is capable of surely protecting the copyrights of contents.

In a third aspect of the present invention pertaining to the controller, the encrypted key information, which the receiving unit receives from the key distribution center, may be given a signature of the key distribution center, and the controller may include: an authentication unit configured to verify the signature by using a public key of the key distribution center, and to cause the encryption unit to stop generating the individually-converted key information when failing to verify the signature.

With the stated structure, it is impossible for the card maker that manufactures the storage medium device to input, into the controller, key information that is different from the encrypted key information generated by the key distribution center. Thus, it is impossible for the card maker to conduct unauthorized acts, such as inputting the same key information into a plurality of controllers.

In a fourth aspect of the present invention pertaining to the controller, the holding unit may further be configured to hold a controller unique number generated by the controller manufacturing device, and the controller may further comprise: a calculation unit configured to apply a given one-way function to the controller unique number, thereby generating the unique information that has a longer bit length than the controller unique number.

With the stated structure, the unique information, which is an encrypted key used for encrypting the key information, can be generated within the controller. Thus, it is possible to prevent the data size of the controller unique number, which has been given to the controller in advance, from becoming too large. For example, assigning only short bits of a unique number by using the eFUSE technology enables the controller to generate an encrypted key that has a data size that ensures the security.

A fifth aspect of the present invention is a storage medium device including a storage device and a controller comprising: a holding unit configured to hold a controller key generated by a controller manufacturing device; a receiving unit configured to receive encrypted key information generated by a key distribution center that is authorized, the encrypted key information generated through encryption of key information with use of the controller key, the key information used for protecting data stored on the storage medium device; and a conversion unit configured to perform conversion on the encrypted key information by using unique information of the controller, thereby generating individually-converted key information.

With the stated structure, it is possible to provide a storage medium device that is capable of surely protecting the copyrights of the content to be stored on the storage device.

In a sixth aspect of the present invention pertaining to the storage medium device, the controller may further comprise: a writing unit configured to write the individually-converted key information generated by the conversion unit into the storage device, and the storage device may comprise: a key storage unit configured to store therein the individually-converted key information.

With the stated structure, it is impossible for each controller to acquire the key information from individually-converted key information written in the storage device in other storage medium devices even if a plurality of controllers manufactured in the same manufacturing lot have the same controller key. Therefore, the present invention is capable of surely protecting the copyrights of contents.

In a seventh aspect of the present invention pertaining to the storage medium device, the storage device may further comprise: a certificate storage unit configured to store therein a media certificate that includes a partial media ID generated by the key distribution center, at least part of the key information, and a signature of the key distribution center, the partial media ID being at least part of a media ID used for protecting data stored on the storage device.

With the stated structure, part of the media ID is generated by the key distribution center that is authorized. Thus, it is impossible for the card maker to conduct unauthorized acts, such as embedding the same media ID into a plurality of storage medium devices.

In an eighth aspect of the present invention pertaining to the storage medium device, the controller may further comprise: a mutual authentication unit configured to perform mutual authentication by causing a host device to authenticate the controller by using the media certificate, and authenticating the host device by using a public key certificate of the host device, and the controller may perform processing together with the host device when the mutual authentication unit successfully completes the mutual authentication.

With the stated structure, when an unauthorized media ID is embedded in a storage medium device, the storage medium device is prevented from being processed by the host device. For example, when the host device is a recording device, the host device avoids recording content onto an unauthorized storage medium device. Also, when the host device is a playback device, the host device avoids playing back content stored on an unauthorized storage medium device.

A ninth aspect of the present invention is a manufacturing system for manufacturing a storage medium device that includes a controller and a storage device, the manufacturing system comprising: a controller manufacturing device configured to generate a controller key, to manufacture a controller in which the generated controller key is embedded, to provide a media assembling device with the generated controller key, and to transmit the controller key to a key distribution center; the key distribution center that is authorized and is configured to generate key information used for protection of data stored on the storage medium device, to encrypt the key information by using the controller key to generate encrypted key information, and to issue the encrypted key information to the media assembling device; and the media assembling device configured to assemble the storage medium device from the controller received from the controller manufacturing device and a storage device, and to input the encrypted key information to the controller, wherein the controller includes: a holding unit configured to hold the controller key; a receiving unit configured to receive the encrypted key information; a conversion unit configured to perform conversion on the encrypted key information by using unique information of the controller, thereby generating individually-converted key information; and a writing unit configured to write the individually-converted key information into the storage device.

With the stated structure, the controller receives the encrypted key information that has been encrypted by using the controller key held by the holding unit. Thus, there is no risk of outputting unencrypted key information to outside the controller. Therefore, it is impossible for card makers, which assemble storage medium devices, to conduct unauthorized acts, such as embedding same key information into a plurality of recording storage medium devices. Also, it is impossible for each controller to acquire the key information embedded in other storage medium devices even if a plurality of controllers manufactured in the same manufacturing lot have the same controller key. Therefore, the present invention is capable of surely protecting the copyrights of contents.

In a tenth aspect of the present invention pertaining to the manufacturing system, the media assembling device may include: a verification unit configured to receive key information pieces from a plurality of storage medium devices on which the key information pieces are stored in one-to-one correspondence, and to verify whether each storage medium device is assigned a different key information piece.

With the stated structure, the verification is performed by the verification unit after the storage medium device is assembled. Thus, it is possible to prevent unauthorized storage medium devices, in which the same key information is embedded, from being distributed to the market.

In an eleventh aspect of the present invention pertaining to the manufacturing system, the manufacturing system may further comprise: a whitelist management device configured to manage a list of unique information pieces of controllers included in storage medium devices each verified as being assigned a different key information piece, wherein the verification unit may transmit, to the whitelist management device, a unique information piece of a controller included in a storage medium device verified as being assigned a different key information piece.

With the stated structure, the card maker registers the verification result relating to the key information into the external whitelist management device. This improves the security of the system.

In a twelfth aspect of the present invention pertaining to the manufacturing system, the manufacturing system may further comprise: a key distribution server configured to store therein a title key used for encryption and decryption of data stored on the storage medium device, wherein the key distribution server, on receipt from a controller of a title key transmission request including a unique information piece of the controller, may determine whether the unique information piece is contained in the list managed by the whitelist management device, and may transmit the title key to the controller when determining that the unique information piece is contained in the list.

With the stated structure, the title key is not distributed to the controllers into which the same key information is embedded. Thus, it is possible to surely protect the copyrights of the content.

A thirteenth aspect of the present invention is a method for manufacturing a storage medium device including a controller and a storage device, the method comprising: a controller manufacturing step in which a controller manufacturing device generates a controller key, manufactures a controller in which the generated controller key is embedded, provides a media assembling device with the generated controller key, and transmits the controller key to a key distribution center; a key distribution step in which the key distribution center generates key information used for protection of data stored on the storage medium device, encrypts the key information by using the controller key to generate encrypted key information, and issues the encrypted key information to the media assembling device; a media assembling step in which the media assembling device assembles the storage medium device from the controller received from the controller manufacturing device and a storage device, and inputs the encrypted key information to the controller; a conversion step in which the controller performs conversion on the encrypted key information by using unique information of the controller, thereby generating individually-converted key information; and a writing step in which the controller writes the individually-converted key information into the storage device.

With the stated structure, the controller receives the encrypted key information that has been encrypted by using the controller key that has been manufactured by the controller manufacturing device. Thus, there is no risk of outputting unencrypted key information to outside the controller. Therefore, it is impossible for card makers, which assemble storage medium devices, to conduct unauthorized acts, such as embedding same key information into a plurality of recording storage medium devices. Also, it is impossible for each controller to acquire the key information embedded in other storage medium devices even if a plurality of controllers manufactured in the same manufacturing lot have the same controller key. Therefore, the present invention is capable of surely protecting the copyrights of contents.

The following describes the details of embodiments of the present invention, with reference to the drawings.

Embodiment 1

<Overall Configuration>

FIG. 1 shows overall configuration of a system for manufacturing a storage medium device in Embodiment 1 of the present invention. The system for manufacturing the storage medium device includes a key distribution center 100, a controller manufacturer 200, an authentication software vendor 300, a media assembler 400, a whitelist distribution center 700, and a key distribution server 800.

Note that the key distribution center 100, the controller manufacturer 200, the authentication software vendor 300, the media assembler 400, and the whitelist distribution center 700 represent devices that belong to the key distribution center, the controller manufacturing device, the authentication software vendor, the media assembling device, and the whitelist distribution center, respectively.

Note that the meanings of the entity described as "key distribution center" in the description of the embodiments are not limited to those directly derived from the name per se. That is, it can be referred to as "key issuance center", "key management center", "key application center", "key operation center", or the like.

The following describes a case where the storage medium device is a memory card.

<Detailed Configuration of the Key Distribution Center 100>

Figure 2:
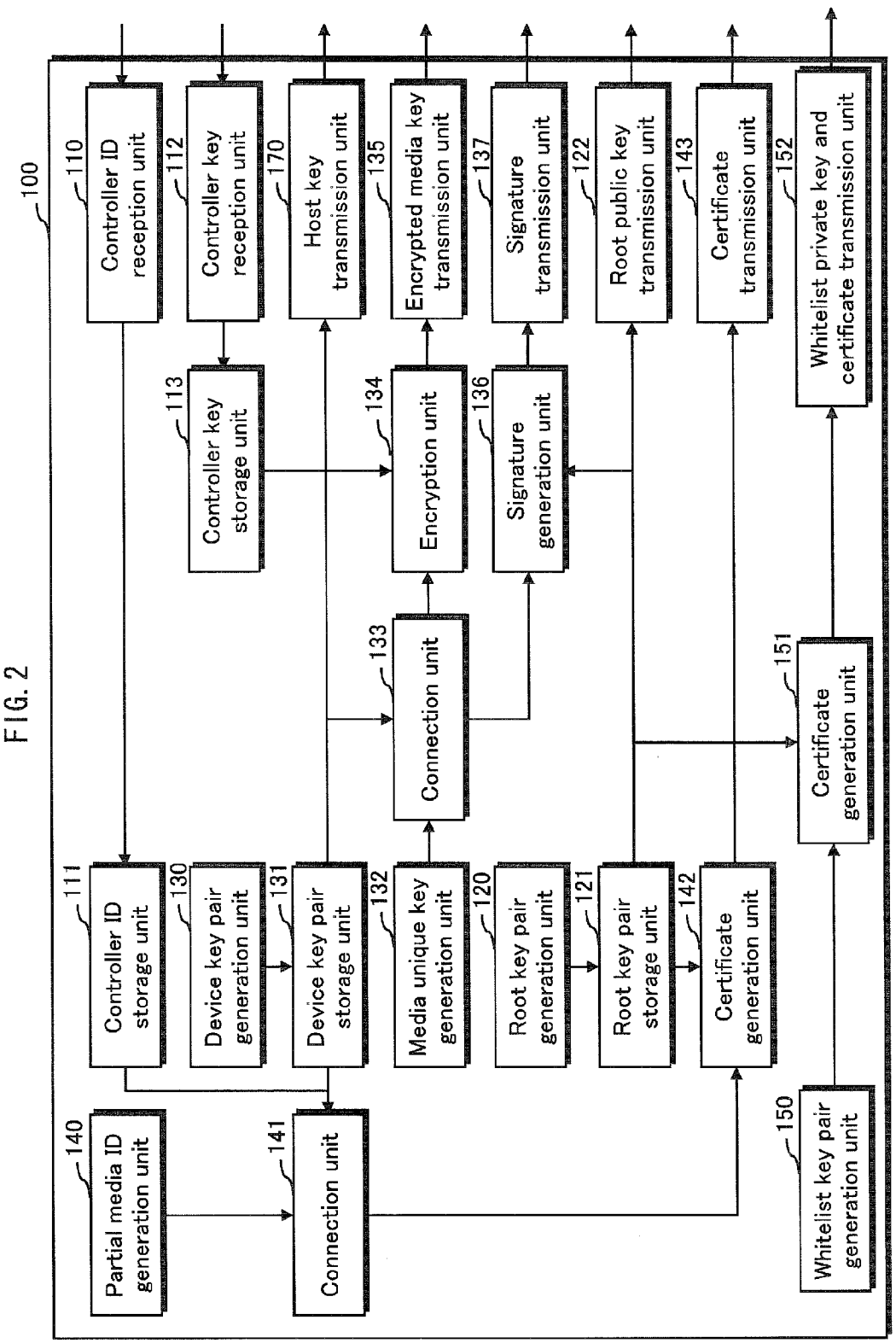
FIG. 2 shows configuration of the key distribution center 100 in Embodiment 1 of the present invention.

FIG. 2 shows detailed configuration of the key distribution center 100.

As shown in FIG. 2, the key distribution center 100 includes a controller ID reception unit 110, a controller ID storage unit 111, a controller key reception unit 112, a controller key storage unit 113, a root key pair generation unit 120, a root key pair storage unit 121, a root public key transmission unit 122, a device key pair generation unit 130, a device key pair storage unit 131, a media unique key generation unit 132, a connection unit 133, an encryption unit 134, an encrypted media key transmission unit 135, a signature generation unit 136, a signature transmission unit 137, a partial media ID generation unit 140, a connection unit 141, a certificate generation unit 142, a certificate transmission unit 143, a whitelist key pair generation unit 150, a certificate generation unit 151, a whitelist private key and certificate transmission unit 152, and a host key transmission unit 170.

The controller ID reception unit 110 receives a controller ID from the controller manufacturer 200.

The controller ID storage unit 111 stores therein the controller ID received by the controller ID reception unit 110.

The controller key reception unit 112 receives a controller key from the controller manufacturer 200.

The controller key storage unit 113 stores therein the controller key received by the controller key reception unit 112 in conjunction with the controller ID received by the controller ID reception unit 110.

The root key pair generation unit 120 generates a key pair consisting of a root public key and a root private key, which become a basis for security in the system for manufacturing the storage medium device, in the key distribution center 100.

The root key pair storage unit 121 stores therein the key pair consisting of the root public key and the root private key generated by the root key pair generation unit 120.

The root public key transmission unit 122 transmits the root public key stored in the root key pair storage unit 121 to the controller manufacturer 200, the authentication software vendor 300, and the key distribution server 800.

The device key pair generation unit 130 generates (i) a media device key pair consisting of a media device public key and a media device private key that are embedded in a storage medium device 500 and (ii) a host device key pair consisting of a host device public key and a host device private key that are embedded in authentication software 600 and the key distribution server 800.

The device key pair storage unit 131 stores therein the media device key pair and the host device key pair generated by the device key pair generation unit 130.

The media unique key generation unit 132 generates a media unique key that is embedded in the storage medium device 500. The media unique key may be generated as a statistically unique key by using random numbers generated by a random number generator, may be generated by using a serial number, and may be generated by transforming the serial number into a unique value with use of a one-way function.

The connection unit 133 generates a media key by connecting the media device private key stored in the device key pair storage unit 131 and the media unique key generated by the media unique key generation unit 132.

The encryption unit 134 generates an encrypted media key by encrypting the media key generated by the connection unit 133 with the controller key stored in the controller key storage unit 113.

The encrypted media key transmission unit 135 transmits the encrypted media key generated by the encryption unit 134 to the media assembler 400.

The signature generation unit 136 generates a signature of the media key generated by the connection unit 133 with use of the root private key stored in the root key pair storage unit 121. Note that the signature generation unit 136 may generate a signature of the encrypted media key generated by the encryption unit 134 instead of generating the signature of the media key generated by the connection unit 133. In this case, however, verification of the signature of the encrypted media key has to be performed in the media assembler 400 that receives the signature of the encrypted media key.

The signature transmission unit 137 transmits the signature of the media key generated by the signature generation unit 136 to the media assembler 400.

The partial media ID generation unit 140 generates a partial media ID that is embedded in a part of identifying information (hereinafter, referred to as a media ID) of the storage medium device 500.

The connection unit 141 generates media certificate source data by connecting the partial media ID generated by the partial media ID generation unit 140, the controller ID stored in the controller ID storage unit 111 and the media device public key stored in the device key pair storage unit 131.

The certificate generation unit 142 generates a media certificate by attaching a signature to the media certificate source data generated by the connection unit 141 with use of the root private key stored in the root key pair storage unit 121. In addition, the certificate generation unit 142 generates a host certificate by attaching a signature to the host device public key stored in the device key pair storage unit 131.

The certificate transmission unit 143 transmits the media certificate generated by the certificate generation unit 142 to the media assembler 400, and transmits the host certificate generated by the certificate generation unit 142 to the authentication software vendor 300 and the key distribution server 800.

The whitelist key pair generation unit 150 generates a whitelist key pair consisting of a whitelist public key and a whitelist private key used to attach a signature to a whitelist generated by the whitelist distribution center 700.

The following describes a purpose of the whitelist. In the media assembler 400, when a media key is properly embedded in the storage medium device 500, a correspondence table showing a correspondence relationship between the media key (in particular, a media unique key) and a controller unique number is transmitted to the whitelist distribution center 700 with respect to all the manufactured storage medium device 500. The whitelist distribution center 700 generates, based on information included in the registered correspondence table, a list of media unique keys that are properly used (i.e. a whitelist), and provides the whitelist to the key distribution server 800.

When receiving a request to obtain a title key from a playback device and a recording device for purchasing and playing back contents, the key distribution server 800 securely receives the media unique key stored in the storage medium device 500 in process of distributing a key to the storage medium device 500, and checks whether the received media unique key is registered in the whitelist. When the received media unique key is registered in the whitelist, the key distribution server 800 determines that the key may be distributed to the storage medium device 500 because the storage medium device 500 is authorized. In contrast, when the received media unique key is not registered in the whitelist, the key distribution server 800 determines that the key should not be distributed to the storage medium device 500 because the storage medium device 500 is to be improperly used. For example, the same media key is embedded in a plurality of the storage medium devices 500.

Before actually selling the manufactured storage medium device 500 in a market, the media assembler 400 registers the correspondence table showing a correspondence relationship between the media unique key and the controller unique number into the whitelist distribution center 700. The whitelist distribution center 700 is then required to add the registered data into the whitelist, and distribute the whitelist to the key distribution server 800.

The certificate generation unit 151 generates a certificate of the whitelist public key by attaching a signature to the whitelist public key generated by the whitelist key pair generation unit 150 with use of the root private key stored in the root key pair storage unit 121.

The whitelist private key and certificate transmission unit 152 transmits the whitelist private key generated by the whitelist key pair generation unit 150 and the certificate of the whitelist public key generated by the certificate generation unit 151 to the whitelist distribution center 700.

The host key transmission unit 170 securely transmits the host device private key stored in the device key pair storage unit 131 to the authentication software vendor 300 and the key distribution server 800.

<Flow of Key Issuing Operations Performed by the Key Distribution Center 100>

Figure 3:
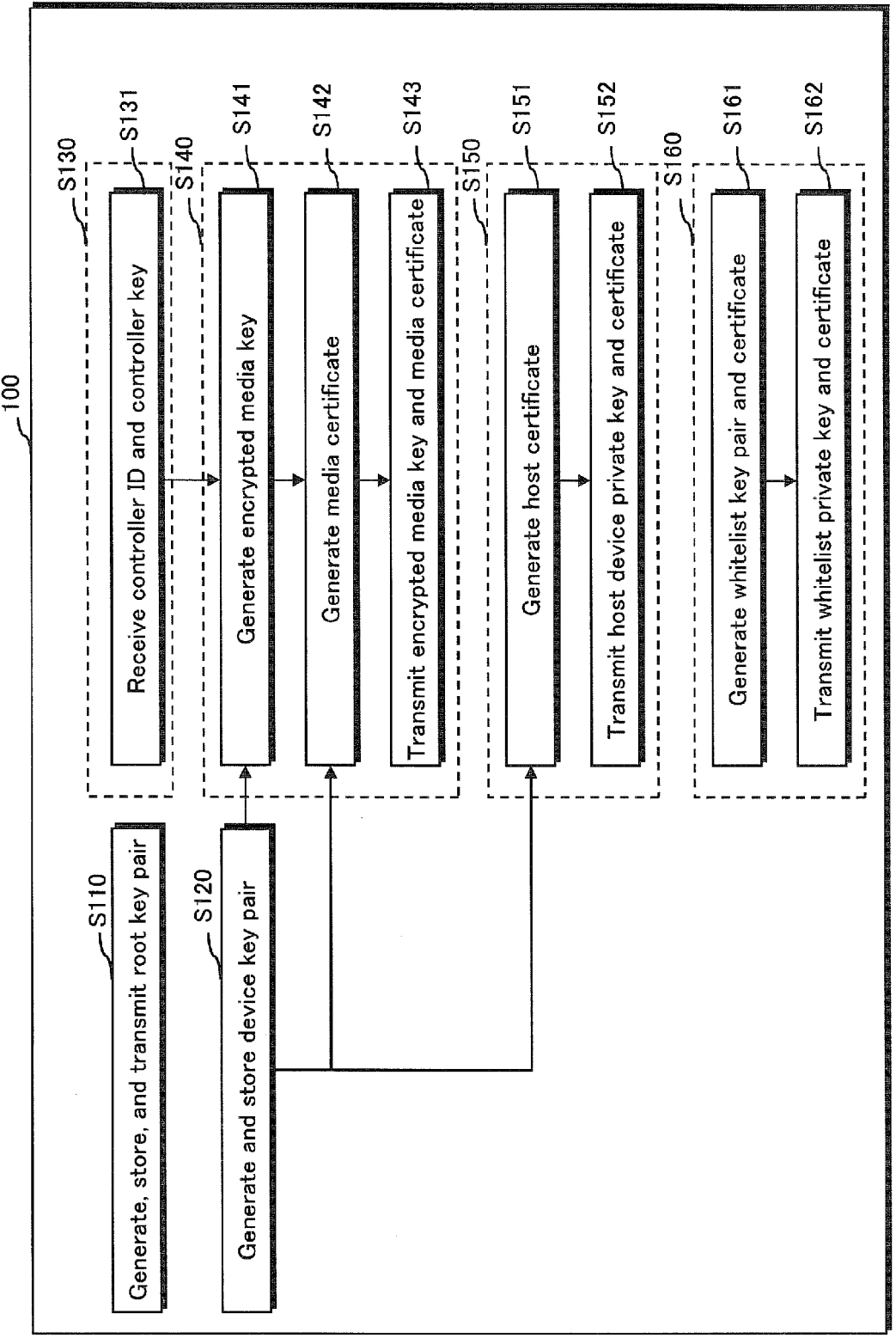
FIG. 3 is a flow chart showing operation at the time of issuing a key in Embodiment 1 of the present invention.

FIG. 3 shows a flow of key issuing operations performed by the key distribution center 100.

The key distribution center 100 generates and stores the root key pair consisting of the root public key and the root private key. Upon request, the key distribution center 100 transmits the root public key to the controller manufacturer 200, the authentication software vendor 300, and the key distribution server 800 (S110). The key distribution center 100 generates and stores a key pair consisting of the media device public key and the media device private key and a key pair consisting of the host device public key and the host device private key (S120).

S130, which is shown by a dashed box, shows a flow of operations for receiving the controller ID and the controller key that correspond to a controller 501 received from the controller manufacturer 200. The controller manufacturer 200 transmits a pair of the controller key and the controller ID that are embedded in the manufactured controller 501 to the key distribution center 100, and the key distribution center 100 stores the controller key and the controller ID in conjunction with each other (S131).

S140, which is shown by a dashed box, shows a flow of operations for issuing a key in response to a request to obtain the encrypted media key and the media certificate from the media assembler 400. Upon receiving the request to obtain the encrypted media key and the media certificate from the media assembler 400, the key distribution center 100 generates the encrypted media key by encrypting the media key, which is generated by the connection unit 133 connecting (i) the media device private key stored in the device key pair storage unit 131 and (ii) the media unique key generated by the media unique key generation unit 132, with the controller key stored in the controller key storage unit 113 (S141). The key distribution center 100 generates the media certificate by attaching a signature to the media certificate source data, which is generated by the connection unit 141 connecting (i) the media device public key stored in the device key pair storage unit 131, (ii) the controller ID stored in the controller ID storage unit 111, and (iii) the partial media ID generated by the partial media ID generation unit 140, with use of the root private key stored in the root key pair storage unit 121 (S142). The key distribution center 100 transmits the generated encrypted media key and media certificate to the media assembler 400 (S143).

S150, which is shown by a dashed box, shows a flow of operations for issuing a key in response to a request to obtain the host device private key and the host certificate from the authentication software vendor 300, the key distribution server 800, and the playback device 900. Upon receiving the request to obtain the host device private key and the host certificate from the authentication software vendor 300, the key distribution server 800, and the playback device 900, the key distribution center 100 generates the host certificate by attaching a signature to the host device public key stored in the device key pair storage unit 131 with use of the root private key stored in the root key pair storage unit 121 (S151). The key distribution center 100 securely transmits a pair of the generated host certificate and the host device private key to the authentication software vendor 300, the key distribution server 800, and the playback device 900 (S152).

S160, which is shown by a dashed box, shows a flow of operations for issuing a key in response to a request to obtain the whitelist private key and the certificate of the whitelist public key from the whitelist distribution center 700. Upon receiving the request to obtain the whitelist private key and the certificate of the whitelist public key from the whitelist distribution center 700, the whitelist key pair generation unit 150 generates a key pair consisting of the whitelist public key and the whitelist private key, and generates the certificate of the whitelist public key by attaching a signature to the whitelist public key with use of the root private key stored in the root key pair storage unit 121 (S161). The key distribution center 100 transmits the whitelist private key and the certificate of the whitelist public key to the whitelist distribution center 700 (S162).

<Detailed Configuration of the Controller Manufacturer 200>

Figure 4:
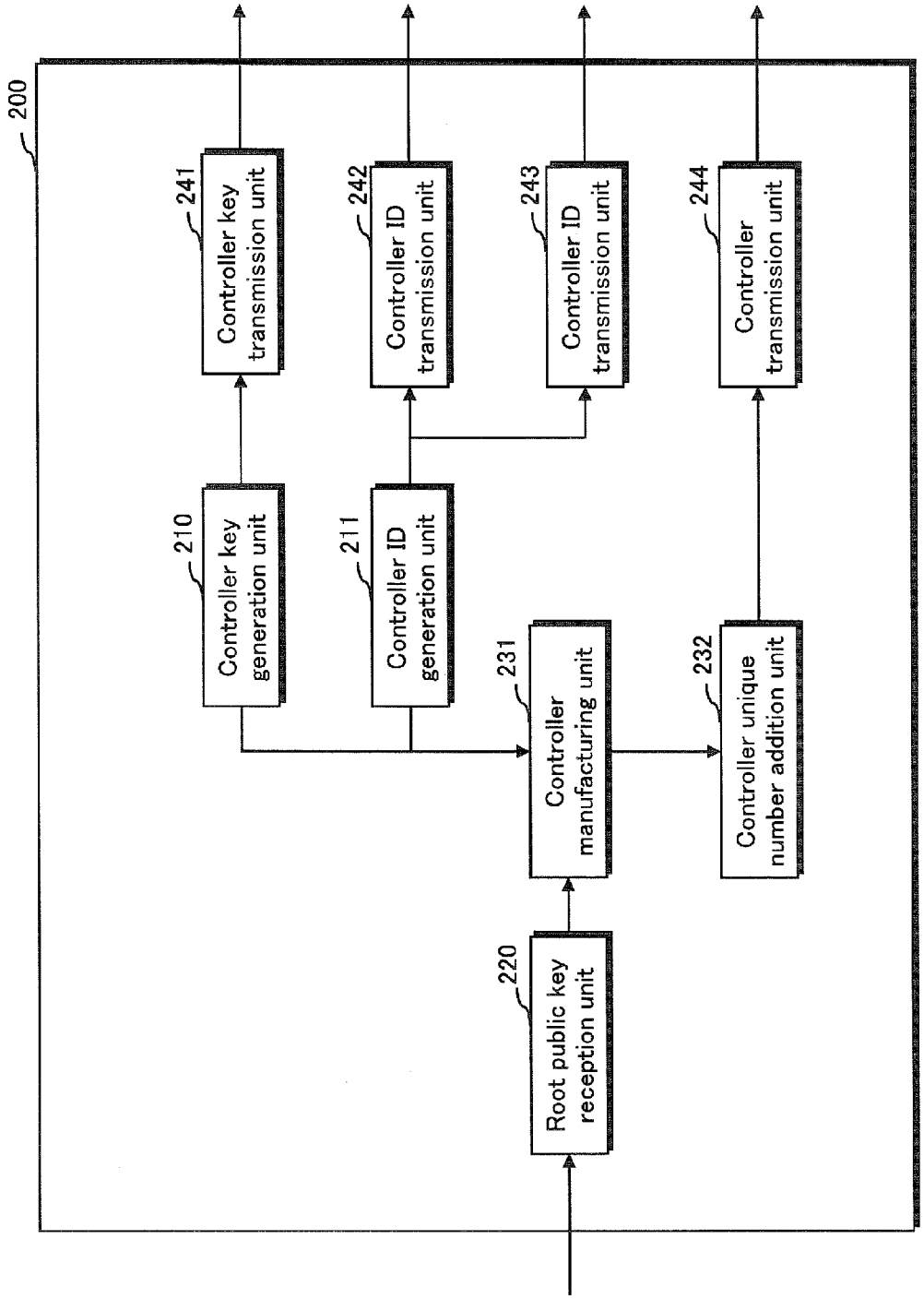
FIG. 4 shows configuration of units that belong to the controller manufacturer 200 in Embodiment 1 of the present invention.

FIG. 4 shows detailed configuration of the controller manufacturer 200.

As shown in FIG. 4, the controller manufacturer 200 includes a controller key generation unit 210, a controller ID generation unit 211, a root public key reception unit 220, a controller manufacturing unit 231, a controller unique number addition unit 232, a controller key transmission unit 241, a controller ID transmission unit 242, a controller ID transmission unit 243, and a controller transmission unit 244.

The controller key generation unit 210 generates the controller key to be embedded in the controller.

The controller ID generation unit 211 generates the controller ID corresponding to the controller.

The root public key reception unit 220 receives the root public key issued by the key distribution center 100.

The controller manufacturing unit 231 manufactures the controller by embedding the controller key, the controller ID, and the root public key in the controller during manufacturing.

The controller unique number addition unit 232 adds, to the controller manufactured by the controller manufacturing unit 231, the controller unique number that is unique to the controller. The controller unique number can be added by, for example, an eFUSE technology in which a part of an electronic circuit is electrically burned out to append a different number to each controller.

The controller key transmission unit 241 transmits the pair of the controller key and the controller ID corresponding thereto to the key distribution center 100.

The controller ID transmission unit 242 transmits the pair of the controller ID and the controller key corresponding thereto to the key distribution center 100.

The controller ID transmission unit 243 transmits the pair of the controller ID and the controller corresponding thereto to the media assembler 400.

The controller transmission unit 244 transmits the pair of the controller 501 and the controller ID corresponding thereto to the media assembler 400.

<Flow of Manufacturing Operations Performed by the Controller Manufacturer 200>

Figure 5:
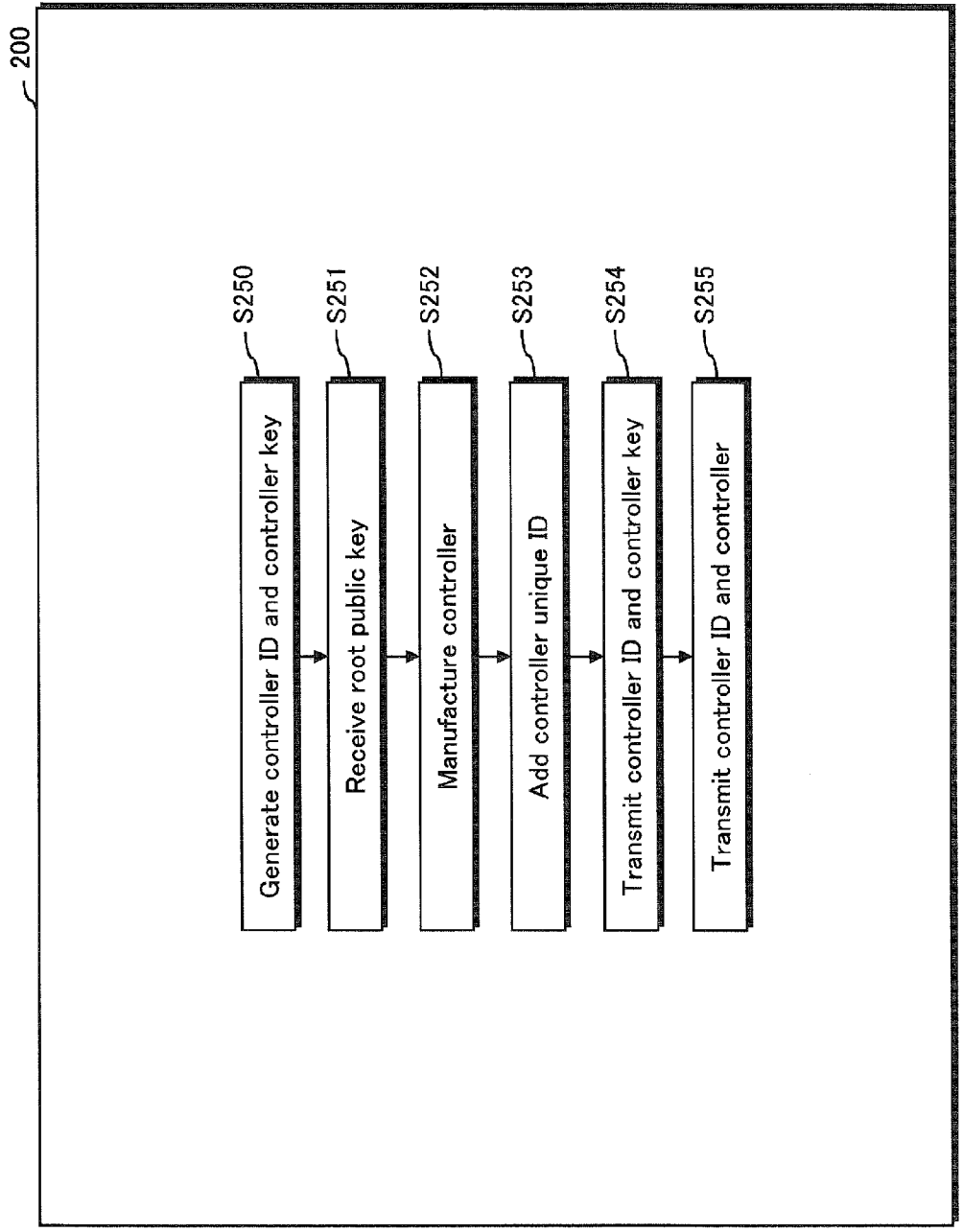
FIG. 5 is a flow chart showing operation at the time of manufacturing a controller in Embodiment 1 of the present invention.

FIG. 5 shows a flow of manufacturing operations performed by the controller manufacturer 200.

The controller manufacturer 200 generates the controller ID and the controller key (S250). The controller manufacturer 200 receives the root public key from the key distribution center 100 (S251). The controller manufacturer 200 manufactures the controller such that the generated controller ID, controller key, and the received root public key are contained in the controller (S252). The controller manufacturer 200 adds, to the controller manufactured in S252, the controller unique number that enables the controller to be identified, for example, by the eFUSE technology (S253). The controller manufacturer 200 transmits the controller ID and the controller key to the key distribution center 100 (S254). Upon receiving an order to issue the controller from the media assembler 400, the controller manufacturer 200 transmits a pair of the controller and the controller ID to the media assembler 400 (S255).

In these manufacturing operations, the controller ID and the controller key are embedded in a mask for manufacturing the controller. Thus, the same controller ID and the same controller key are embedded in the controllers that are manufactured with the same mask. Since different controller IDs and different controller keys are embedded in different masks. Thus, if the lot unit (i.e. the number of controllers manufactured with the same mask) is ten thousand, values of the controller key and the controller ID are switched in units of ten thousand.

<Detailed Configuration of the Authentication Software Vendor 300>

Figure 6:
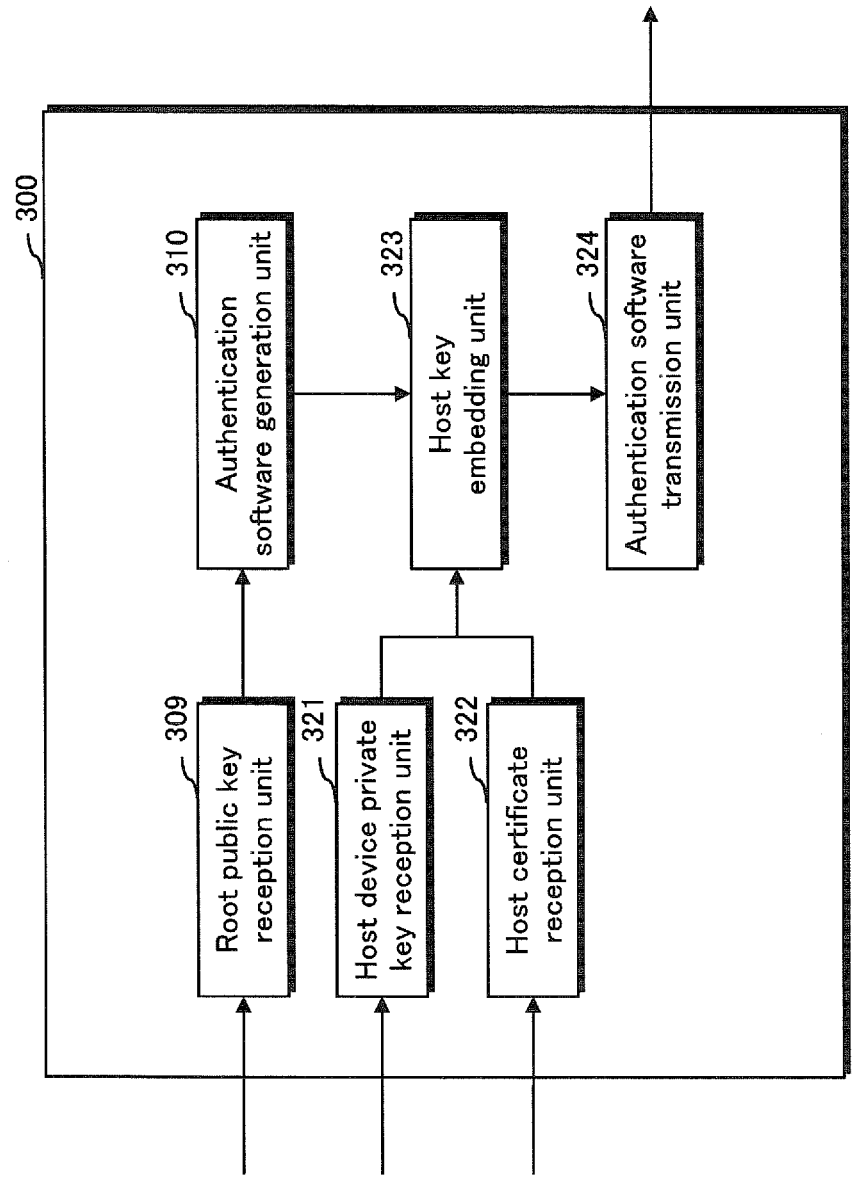
FIG. 6 shows configuration of units that belong to the authentication software vendor 300 in Embodiment 1 of the present invention.

FIG. 6 shows detailed configuration of the authentication software vendor 300

As shown in FIG. 6, the authentication software vendor 300 includes a root public key reception unit 309, an authentication software generation unit 310, a host device private key reception unit 321, a host certificate reception unit 322, a host key embedding unit 323, and an authentication software transmission unit 324.

The root public key reception unit 309 receives the root public key transmitted from the key distribution center 100.

The authentication software generation unit 310 generates the authentication software 600 such that the root public key received by the root public key reception unit 309 is contained in the authentication software 600. The details of the authentication software 600 will be described later.

The host device private key reception unit 321 receives the host device private key transmitted from the key distribution center 100.

The host certificate reception unit 322 receives the host certificate transmitted from the key distribution center 100.

The host key embedding unit 323 securely embeds, in the authentication software 600 generated by the authentication software generation unit 310, (i) the host device private key received by the host device private key reception unit 321 and (ii) the host certificate received by the host certificate reception unit 322.

The authentication software transmission unit 324 transmits the completed authentication software 600 to the media assembler 400.

<Flow of Authentication Software Manufacturing Operations Performed by the Authentication Software Vendor 300>

Figure 7:
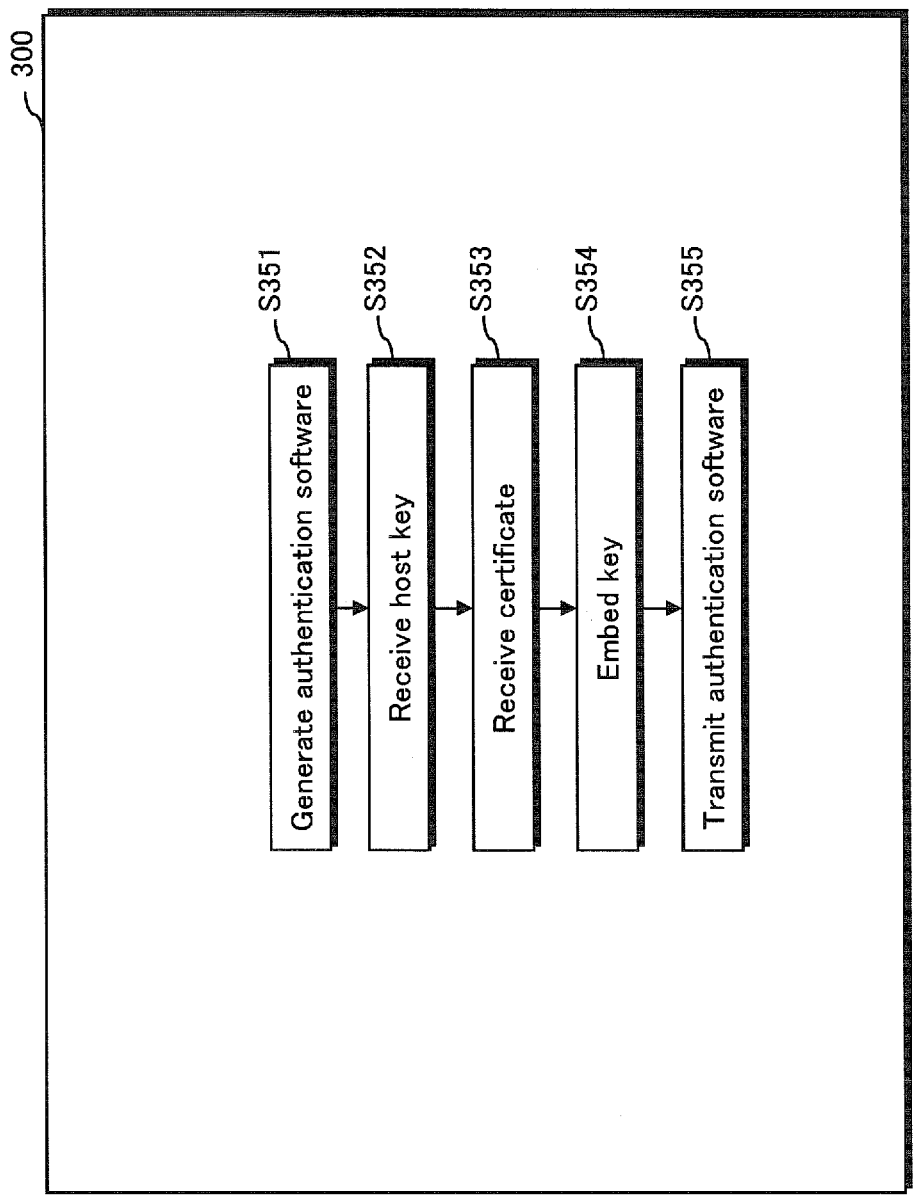
FIG. 7 is a flow chart showing operation at the time of generating the authentication software in Embodiment 1 of the present invention.

FIG. 7 shows a flow of operations for manufacturing the authentication software 600 performed by the authentication software vendor 300.

The authentication software vendor 300 generates the authentication software 600 (S351). The authentication software vendor 300 securely receives the host device private key from the key distribution center 100 (S352). The authentication software vendor 300 receives the host certificate from the key distribution center 100 (S353). The authentication software vendor 300 securely embeds the host device private key and the host certificate that are received from the key distribution center 100 in the authentication software 600, for example, by implementing tamper resistant technology (S354). The authentication software vendor 300 transmits the authentication software 600 to the media assembler 400 (S355).

<Detailed Configuration of Key Writing Processing Performed by the Media Assembler 400>

Figure 8:
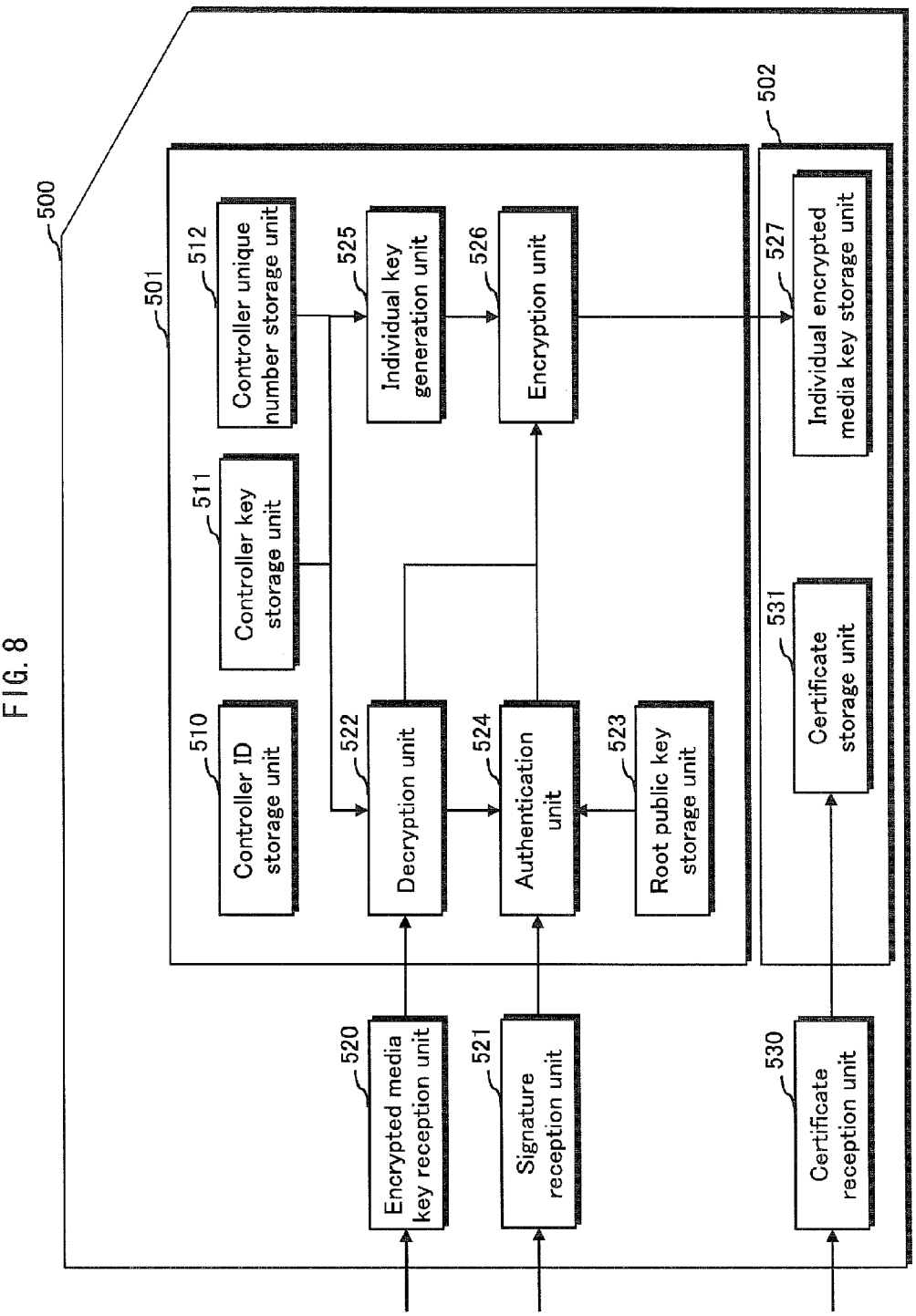
FIG. 8 shows configuration of a storage medium device 500 and a device that belongs to a media manufacturer 400 in Embodiment 1 of the present invention.

FIG. 8 shows detailed configuration of key writing processing performed by the media assembler 400.

As shown in FIG. 8, the storage medium device 500 includes the controller 501 and a flash memory 502. The controller 501 includes a controller ID storage unit 510, a controller key storage unit 511, a controller unique number storage unit 512, a decryption unit 522, a root public key storage unit 523, an authentication unit 524, an individual key generation unit 525, and an encryption unit 526. The flash memory 502 includes an individual encrypted media key storage unit 527 and a certificate storage unit 531. The media assembler 400 includes an encrypted media key reception unit 520, a signature reception unit 521 and a certificate reception unit 530.

The controller 501 is an LSI device received by the media assembler 400 from the controller manufacturer 200. Processing performed inside the controller 501 is securely protected, and a value cannot be read out from outside.

The controller ID storage unit 510 stores therein the controller IDs.

The controller key storage unit 511, as a holding unit pertaining to the present invention, stores therein the controller keys.

Controller IDs in the same lot have the same value that is unique to each lot. Also, controller keys in the same lot have the same value that is unique to each lot. Here, the lot refers to a manufacturing unit in which one mask is used for the manufacturing. For example, one lot amounts to ten thousand, hundred thousand, or the like.

The controller unique number storage unit 512 stores therein the controller unique numbers. Each controller unique number has a unique value.

The decryption unit 522, as a combination of the receiving unit and part of the conversion unit pertaining to the present invention, receives the encrypted media key from the encrypted media key reception unit 520, and decrypts the received encrypted media key by using the controller key stored in the controller key storage unit 511.

The root public key storage unit 523 stores therein the root public key.

The authentication unit 524, as the authentication unit pertaining to the present invention, verifies the signature of the media key received by the signature reception unit 521 with use of the root public key stored in the root public key storage unit 523, to determine whether the media key generated by the decryption unit 522 through decryption is legitimate. When the verification is successful, the authentication unit 524 allows the encryption unit 526 to perform processing. When the verification is unsuccessful, the authentication unit 524 stops the encryption unit 526 from performing the processing.

The individual key generation unit 525, as the calculation unit pertaining to the present invention, generates an individual key that is unique to the controller 501 and cannot be obtained from the outside of the controller 501 with use of (i) the controller key stored in the controller key storage unit 511 and (ii) the controller unique number stored in the controller unique number storage unit 512.

For example, the individual key generation unit 525 may generate the individual key by combining the controller key with the controller unique number, or obtain the individual key by performing an XOR operation on the controller key and the controller unique number. Alternatively, the individual key generation unit 525 may obtain the individual key by performing an operation with use of a hash function, such as SHA-1, on data generated by combining the controller key and the controller unique number. In other words, the individual key generation unit 525 may use any one-way function as long as the individual key generation unit 525 can generate an individual key that is unique to the controller 501 by using the function.

As described above the controller unique number is a number that is unique to the controller 501 and has been generated by the controller manufacturer. In this embodiment, it is assumed that the controller unique number is generated by using the eFUSE technology or the like. With the eFUSE technology, however, it is only possible to generate a 32-bit unique number at the longest, for example. Thus, in the present invention, the individual key generation unit 525 generates the individual key having a bit length that is long enough for ensuring the security as an encryption key (e.g. 128 bits). If the controller unique number generated by the controller manufacture 200 has a bit length long enough for ensuring the security as an encryption key, the controller unique number may be used as the individual key.

The encryption unit 526, as a combination of part of the conversion unit and the writing unit pertaining to the present invention, generates an individual encrypted media key by encrypting the media key that is generated by the decryption unit 522 through decryption with the individual key generated by the individual key generation unit 525. The encryption unit 526 then writes the generated individual encrypted media key into the individual encrypted media key storage unit 527 of the flash memory 502.

The flash memory 502 is a storage device that the media assembler 400 has received from a flash memory manufacturer, which is not depicted.

The individual encrypted media key storage unit 527 stores therein the individual encrypted media key generated by the encryption unit 526.

The certificate storage unit 531 stores therein the media certificate received by the certificate reception unit 530.

Note that, although not depicted, the flash memory 502 naturally has a user area into which a user writes digital contents.

The media assembler 400 assembles the storage medium device 500 from the controller 501 and the flash memory 502.

The encrypted media key reception unit 520 receives the encrypted media key transmitted from the key distribution center 100. The encrypted media key reception unit 520 outputs the encrypted media key to the decryption unit 522 of the controller 501.

The signature reception unit 521 receives the signature of the media key transmitted from the key distribution center 100. The signature reception unit 521 outputs the signature of the media key to the authentication unit 524 of the controller 501.

The certificate reception unit 530 receives the media certificate transmitted from the key distribution center 100. The certificate reception unit 530 stores the media certificate into the certificate storage unit 531 of the flash memory 502.

<Detailed Configuration of Authentication Processing Performed by the Media Assembler 400 Using the Authentication Software 600>

Figure 9:
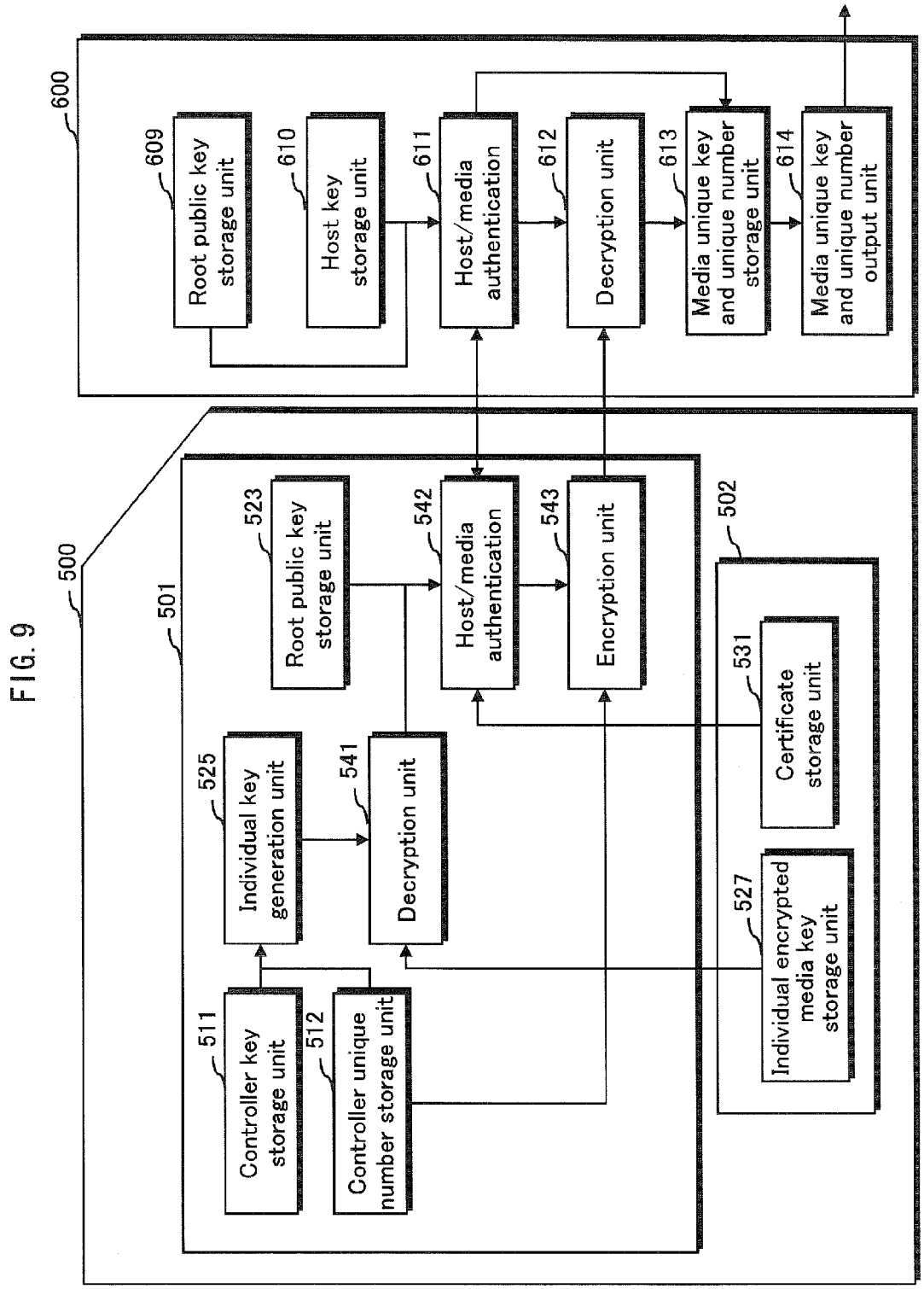
FIG. 9 shows configuration of the storage medium device 500 and the authentication software 600 in Embodiment 1 of the present invention.

FIG. 9 shows detailed configuration of authentication processing performed by the media assembler 400. After the assembling the storage medium device 500, the media assembler 400 performs authentication processing on the storage medium device 500 by using the authentication software 600, before the shipment to retailers.

As shown in FIG. 9, the storage medium device 500 includes the controller 501 and a flash memory 502. The controller 501 includes the controller key storage unit 511, the controller unique number storage unit 512, the root public key storage unit 523, the individual key generation unit 525, a decryption unit 541, a host/media authentication unit 542, and an encryption unit 543. The flash memory 502 includes an individual encrypted media key storage unit 527 and a certificate storage unit 531.

On the other hand, the authentication software 600 includes a root public key storage unit 609, a host key storage unit 610, a host/media authentication unit 611, a decryption unit 612, a media unique key and unique number storage unit 613, and a media unique key and unique number output unit 614.

The controller 501 is an LSI device received by the media assembler 400 from the controller manufacturer 200. Processing performed inside the controller 501 is securely protected, and a value cannot be read out from outside.

The controller key storage unit 511 stores therein the controller keys. Controller keys in the same lot have the same value that is unique to each lot.

The controller unique number storage unit 512 stores therein the controller unique numbers. Each controller unique number has a unique value.

The individual key generation unit 525 generates an individual key that is unique to the controller 501 and cannot be obtained from the outside of the controller 501 with use of (i) the controller key stored in the controller key storage unit 511 and (ii) the controller unique number stored in the controller unique number storage unit 512. The details of the individual key are as described above.

The decryption unit 541 generates the media key by decrypting the individual encrypted media key stored in the individual encrypted media key storage unit 527 with the individual key generated by the individual key generation unit 525. Note that, since being processed only in the controller 501, the media key generated through decryption cannot be read out from the outside of the controller 501.

The host/media authentication unit 542, as the mutual authentication unit pertaining to the present invention, performs mutual authentication with the host/media authentication unit 611 in the authentication software 600 with use of (i) the media device private key that is included in the media key decrypted by the decryption unit 541, (ii) the media certificate stored in the certificate storage unit 531, and (iii) the root pubic key stored in the root public key storage unit 523. Details of the mutual authentication are described later.

The encryption unit 543 generates an encrypted controller unique number by encrypting the controller unique number stored in the controller unique number storage unit 512 with a shared key that is generated as a result of the mutual authentication performed by the host/media authentication unit 542.

The root public key storage unit 523 stores therein the root public key.

The flash memory 502 is a storage device that the media assembler 400 has received from the flash memory manufacturer.

The individual encrypted media key storage unit 527, as the key storage unit pertaining to the present invention, stores therein the individual encrypted media key.

The certificate storage unit 531 stores therein the media certificate.

The authentication software is a computer program on the memory. The authentication unit pertaining to the present invention is realized with the authentication software 600 and a processor belonging to the media assembler 400. In other words, the processor of the media assembler 400 executes the authentication software 600, thereby realizing the function of the authentication unit.

The host key storage unit 610 stores therein the host device private key and the host certificate of the host device public key.

The host/media authentication unit 611 performs mutual authentication with the host/media authentication unit 542 in the controller 501 in the storage medium device 500 with use of (i) the host device private key and the host certificate that are stored in the host key storage unit 610 and (ii) the root public key stored in the root public key storage unit 609. Details of the mutual authentication are described later.

The decryption unit 612 decrypts, with a shared key that is generated as a result of the mutual authentication performed by the host/media authentication 611, the encrypted controller unique number that is generated by the encryption unit 543 through encryption to obtain the controller unique number.

The media unique key and unique number storage unit 613 stores therein (i) the controller unique number obtained by the decryption unit 612 and (ii) the media unique key that is obtained by the host/media authentication 611 in process of the mutual authentication.

The media unique key and unique number output unit 614 outputs the correspondence table showing a correspondence relationship between the media unique key and the controller unique number that are stored in the media unique key and unique number storage unit 613. The correspondence table showing a correspondence relationship between the media unique key and the controller unique number output from the authentication software 600 is transmitted by the media assembler 400 to the whitelist distribution center 700.

Figure 10:
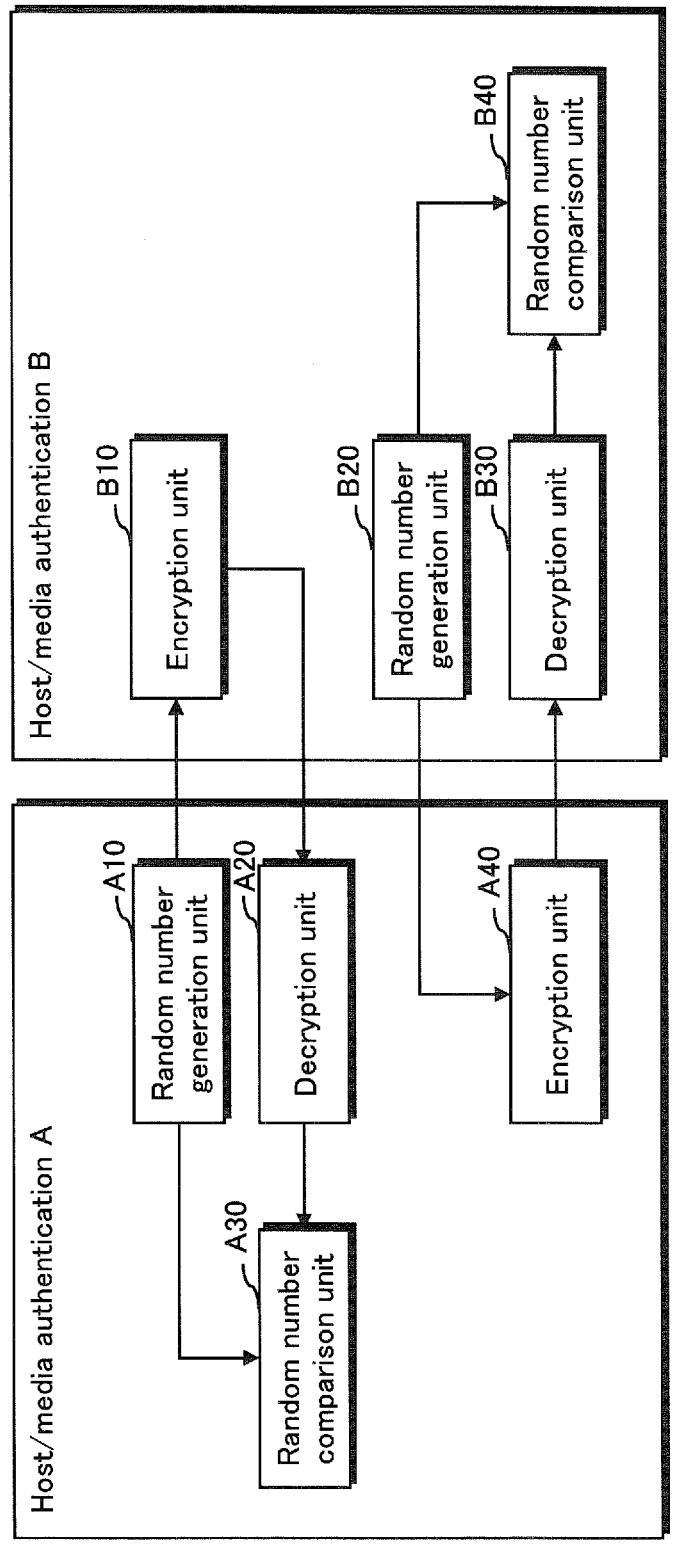
FIG. 10 shows an example of mutual authentication.

FIG. 10 shows general operations for the mutual authentication.

(a) A random number generation unit A10 in a host/media authentication unit A generates a random number R1, and transmits the generated random number R1 to a host/media authentication B.

(b) A random number generation unit A10 in a host/media authentication A generates a random number R1, and transmits the generated random number R1 to a host/media authentication B.

(c) A decryption unit A20 in the host/media authentication A decrypts the received E(Ksc, R1) with the unique key Ksc (D(Ksc, (E(Ksc, R1))(=R1).

(d) A random number comparison unit A30 in the host/media authentication A authenticates a module when a result of the decryption in (c) and the random number generated in (a) correspond with each other.

(e) A random number generation unit B20 in a host/media authentication B generates a random number R2, and transmits the generated random number R2 to a host/media authentication A.

(f) An encryption unit A40 in the host/media authentication A encrypts the random number R2 with the unique key Ksc (E(Ksc, R2), and transmits the encrypted random number R2 to the host/media authentication B.

(g) A decryption unit B30 in the host/media authentication B decrypts the received E(Ksc, R2) with the unique key Ksc (D(Ksc, (E(Ksc, R2)) (=R2).

A random number comparison unit B40 in the host/media authentication B authenticates a module when a result of the decryption in (g) and the random number generated in (e) correspond with each other. Here, both the host/media authentication A and the host/media authentication B use a value obtained by applying R1||R2 to a one-way function using a Ksc as a shared key.

Note that operations of the mutual authentication described here is just an example, and mutual authentication may be performed by using the other methods.

<Flow of Operations for Manufacturing the Storage Medium Device 500 Performed by the Media Assembler 400>

Figure 11:
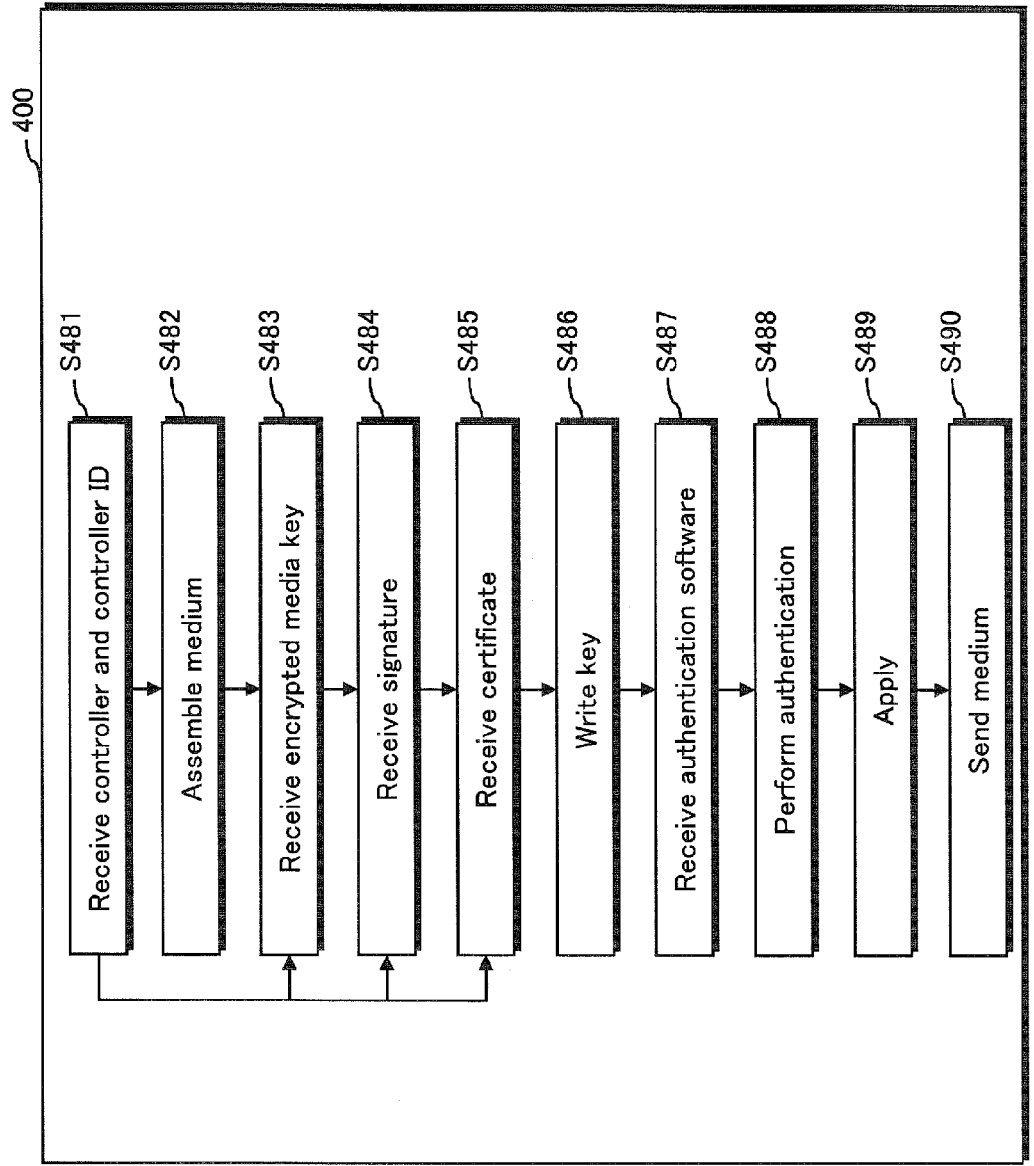
FIG. 11 is a flow chart showing operation at the time of manufacturing the storage medium device 500 in Embodiment 1 of the present invention.

FIG. 11 shows a flow of operations for manufacturing the storage medium device 500 performed by the media assembler 400.

After issuing an order of the controller 501 to the controller manufacturer 200, the media assembler 400 receives the controller ID and the controller 501 from the controller manufacturer 200 (S481). The media assembler 400 assembles the storage medium device 500 with use of the received controller 501 (S482).

The media assembler 400 requests the key distribution center 100 to issue the encrypted media key, the signature of the media key, and the media certificate by specifying the controller ID received from the controller manufacturer 200, and receives the encrypted media key, the signature of the media key, and the media certificate issued by the key distribution center 100 (S483, S484, and S485).

Note that, since the encrypted media key, the signature of the media key, and the media certificate are grouped together, they cannot be used by the controller 501 having a different controller ID, and, in addition, they are required to be collectively written to the same storage medium device 500.

The media assembler 400 writes the received encrypted media key, signature of the media key, and media certificate to the storage medium device 500 (S486). The media assembler 400 receives the authentication software 600 from the authentication software vendor 300 (S487). The media assembler 400 performs authentication with use of the received authentication software 600 (S488). The media assembler 400 transmits the correspondence table showing a correspondence relationship between the media unique key and the controller unique number that is output by the authentication software 600 to the whitelist distribution center 700 (S489). Upon receiving a notification of completion of the processing from the whitelist distribution center 700, the media assembler 400 sends the storage medium device 500 to retailers and so on (S490).

<Detailed Configuration of the Whitelist Distribution Center 700>

Figure 12:
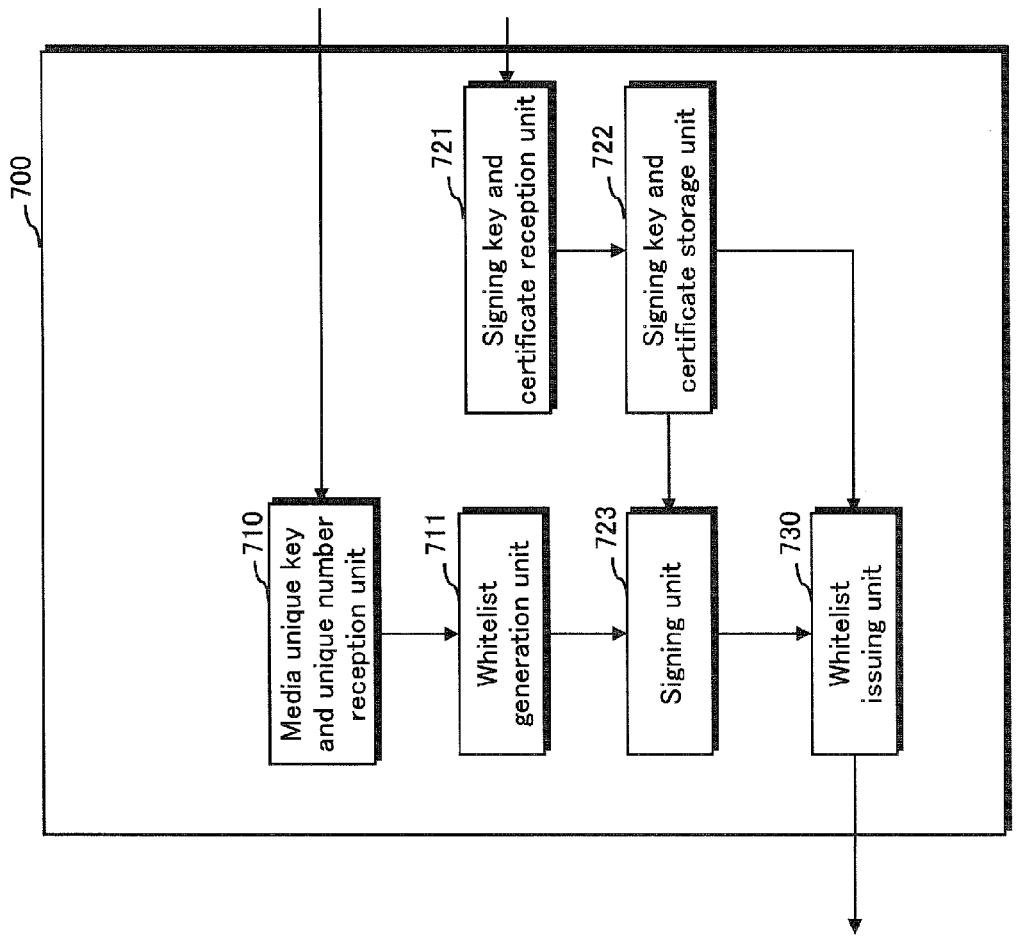
FIG. 12 shows configuration of units belonging to the whitelist distribution center 700 in Embodiment 1 of the present invention.

FIG. 12 shows detailed configuration of the whitelist distribution center 700 as the whitelist management apparatus pertaining to the present invention.

As shown in FIG. 12, the whitelist distribution center 700 includes a media unique key and unique number reception unit 710, a whitelist generation unit 711, a signing key and certificate reception unit 721, a signing key and certificate storage unit 722, a signing unit 723, and a whitelist issuing unit 730.

The media unique key and unique number reception unit 710 receives the correspondence table showing a correspondence relationship between the media unique key and the controller unique number from the media assembler 400.

The whitelist generation unit 711 extracts the media unique key from the correspondence table showing a correspondence relationship between the media unique key and the controller unique number received by the media unique key and unique number reception unit 710, and adds the extracted media unique key to the whitelist.

Note that, when the key distribution center 100 mistakenly writes the same media key to a plurality of the storage medium devices 500, the whitelist generation unit 711 may not add the media unique key to the whitelist. When the whitelist generation unit 711 adds the media unique key to the whitelist, a flag as attribute information, showing that the media device secret key or the media unique key have been mistakenly written to the plurality of the storage medium devices 500, may further be added.

Writing the same media key to the plurality of the storage medium devices 500 is an unauthorized act. When the media unique key is an identified media key, however, the key distribution server 800 may distribute the media key in its own judgment, or may stop distributing the media key. For example, the key distribution server 800 may distribute the media key in a case of contents with SD image quality or lower quality, and stop distributing the media unique key in a case of contents with HD image quality or a comparable value.

The signing key and certificate reception unit 721 securely receives the whitelist private key and the certificate of the whitelist public key from the key distribution center 100.

The signing key and certificate storage unit 722 stores therein the whitelist private key and the certificate of the whitelist public key that are received by the signing key and certificate reception unit 721.

The signing unit 723 attaches a signature to the whitelist that is updated by the whitelist generation unit 711 with use of the whitelist private key stored in the signing key and certificate storage unit 722.

The whitelist issuing unit 730 transmits the updated whitelist to which the signature has been attached by the signing unit 723 to the key distribution server 800.

<Flow of Whitelist Issuing Operations Performed by the Whitelist Distribution Center 700>

Figure 13:
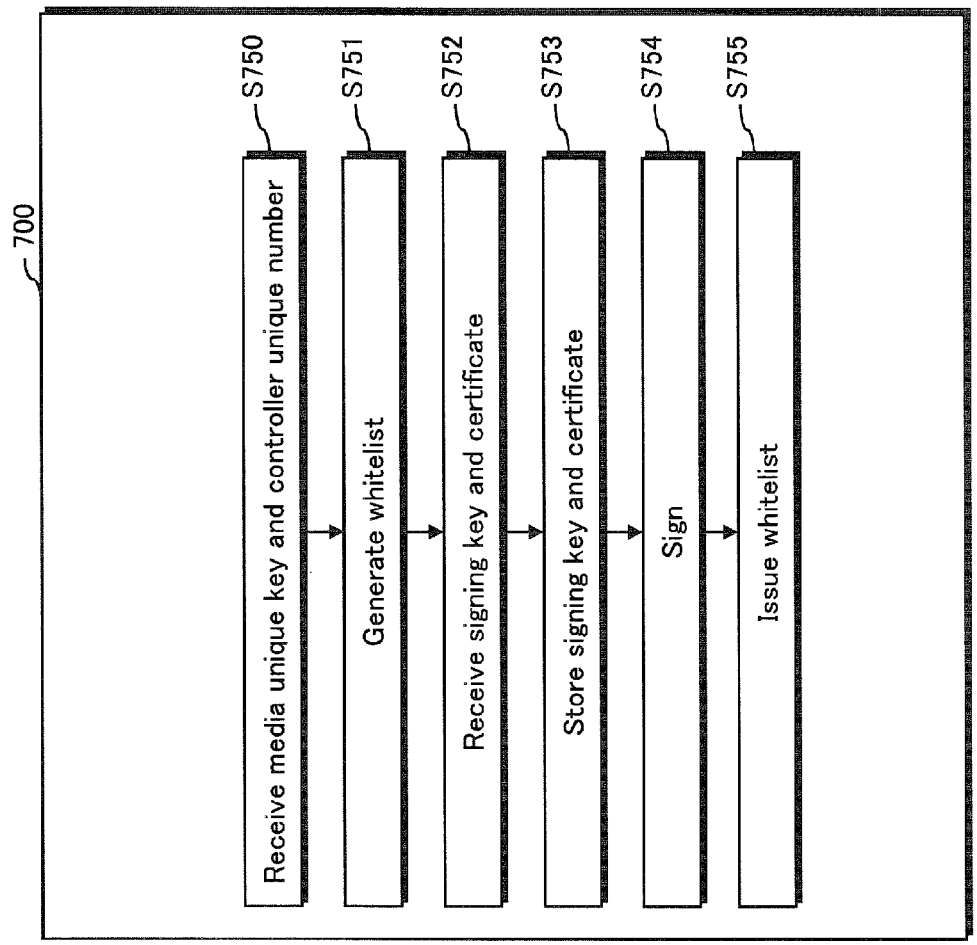
FIG. 13 is a flow chart showing operation of the whitelist distribution center 700 at the time of issuing a whitelist in Embodiment 1 of the present invention.

FIG. 13 shows a flow of whitelist issuing operations performed by the whitelist distribution center 700.

The media unique key and unique number reception unit 710 receives, from the media assembler 400, the completed correspondence table showing a correspondence relationship between the media unique key and the controller unique number with respect to the storage medium device 500 (S750). The whitelist distribution center 700 adds the received correspondence table to a current whitelist (S751). The whitelist distribution center 700 securely receives the whitelist private key and the certificate of the whitelist public key from the key distribution center 100 (S752). The whitelist distribution center 700 stores the received whitelist private key and the certificate of the whitelist public key (S753). The whitelist generation unit 711 attaches a signature to the updated whitelist with use of the whitelist private key stored in the signing key and certificate storage unit 722 (S754). The whitelist distribution center 700 issues the latest whitelist to which the signature has been attached by the signing unit 723 to the key distribution server 800.

<Detailed Configuration of the Key Distribution Server 800 and the Storage Medium Device 500>

Figure 14:
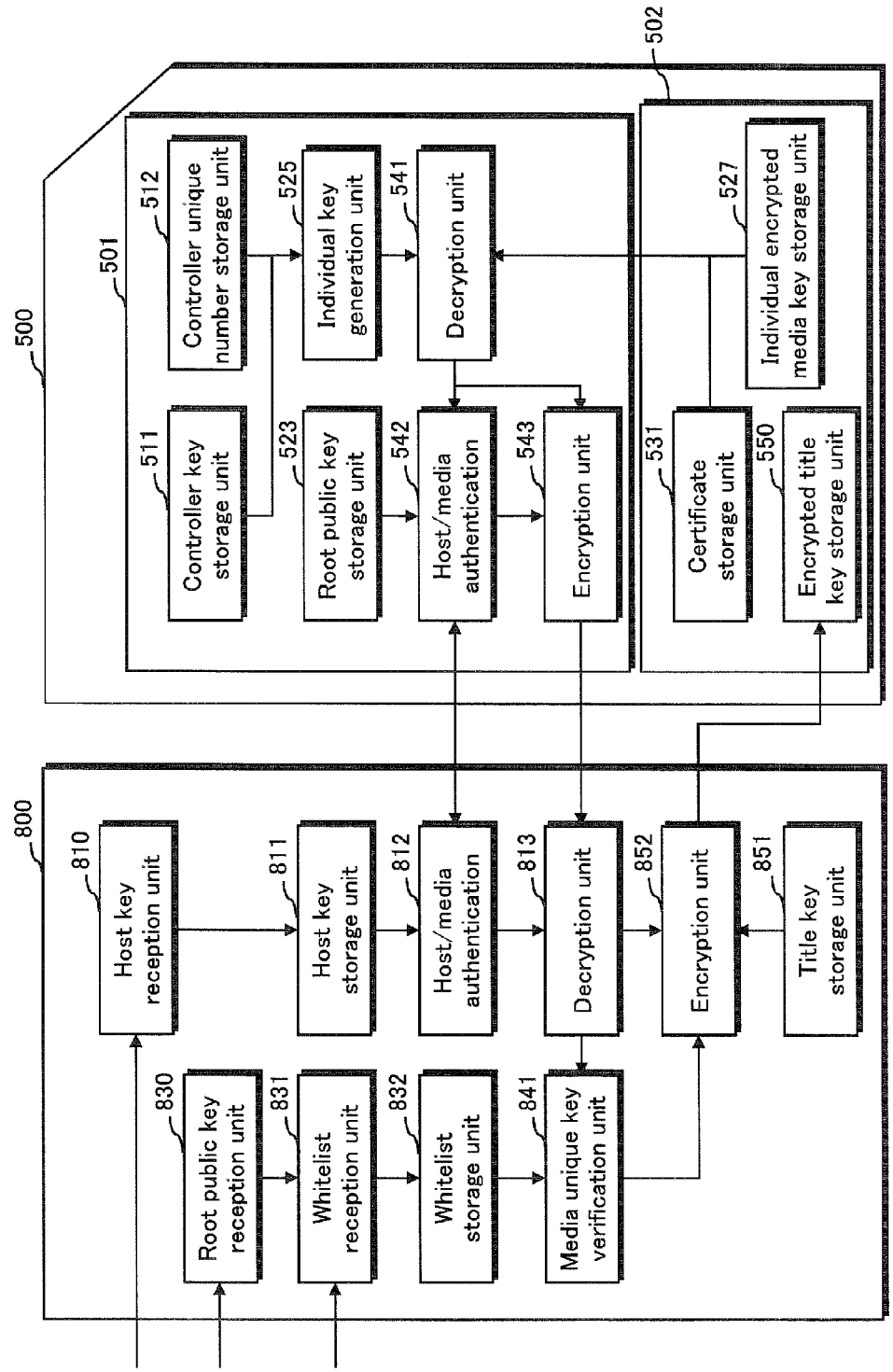
FIG. 14 shows configuration of the key distribution server 800 and the storage medium device 500 in Embodiment 1 of the present invention.

FIG. 14 shows detailed configuration of the key distribution server 800 and the storage medium device 500.

As shown in FIG. 14, the key distribution server 800 includes a host key reception unit 810, a host key storage unit 811, a host/media authentication 812, a decryption unit 813, a root public key reception unit 830, a whitelist reception unit 831, a whitelist storage unit 832, a media unique key verification unit 841, a title key storage unit 851, and an encryption unit 852.

On the other hand, the storage medium device 500 includes the controller 501 and the flash memory 502. The controller 501 includes the controller key storage unit 511, the controller unique number storage unit 512, the root public key storage unit 523, the individual key generation unit 525, the decryption unit 541, the host/media authentication 542, and the encryption unit 543. The flash memory 502 includes the individual encrypted media key storage unit 527, certificate storage unit 531 and the encrypted title key storage unit 550.

The key distribution server 800 is an apparatus for distributing a key to the storage medium device 500 when receiving a request for acquiring a title key from the recording device or the playback device for purchasing and playing back contents.

The host key reception unit 810 securely receives the host device private key and the host certificate of the host device public key from the key distribution center 100.

The host key storage unit 811 stores therein the host device private key and the host certificate of the host device public key that are received by the host key reception unit 810.

The host/media authentication 812 performs mutual authentication with the host/media authentication 542 in the controller 501 in the storage medium device 500 with use of the host device private key and the host certificate of the host device public key that are stored in the host key storage unit 811 to generate a shared key.

The decryption unit 813 decrypts, with the shared key generated by the host/media authentication 812, the encrypted media unique key that is generated by the encryption unit 543 in the controller 501 in the storage medium device 500 through encryption.

The root public key reception unit 830 receives the root public key from the key distribution center 100.

The whitelist reception unit 831 receives the whitelist issued by the whitelist distribution center 700.

The whitelist storage unit 832 stores therein the whitelist received by the whitelist reception unit 831.

The media unique key verification unit 841 verifies whether the media unique key that is obtained by the decryption unit 813 through decryption is registered in the whitelist stored in the whitelist storage unit 832. When the media unique key is registered in the whitelist, the media unique key verification unit 841 allows the encryption unit 852 to perform processing. When the media unique key is not registered in the whitelist, the media unique key verification unit 841 stops the encryption unit 852 from performing the processing.

The title key storage unit 851 stores therein the title key that is used for encryption and decryption of contents.

The encryption unit 852 generates the encrypted title key by encrypting the title key stored in the title key storage unit 851 with the media unique key generated by the decryption unit 813 through decryption, and transmits the encrypted title key to the storage medium device 500.

The controller 501 is an LSI device, and the flash memory 502 is a storage device.

The controller key storage unit 511 stores therein the controller keys. Controller keys in the same lot have the same value that is unique to each lot.

The controller unique number storage unit 512 stores therein the controller unique numbers. Each controller unique number has a unique value.

The root public key storage unit 523 stores therein the root public key.

The individual key generation unit 525 generates the individual key that is unique to the controller 501 and cannot be obtained from the outside of the controller 501 with use of (i) the controller key stored in the controller key storage unit 511 and (ii) the controller unique number stored in the controller unique number storage unit 512.

The decryption unit 541 generates the media key by decrypting the individual encrypted media key stored in the individual encrypted media key storage unit 527 with the individual key generated by the individual key generation unit 525. Note that, since being processed only in the controller 501, the media key generated through decryption cannot be read out from the outside of the controller 501.

The host/media authentication 542, as the mutual authentication unit pertaining to the present invention, performs mutual authentication with the host/media authentication 812 in the authentication software 800 with use of (i) the media device private key that is included in the media key decrypted by the decryption unit 541, (ii) the media certificate stored in the certificate storage unit 531, and (iii) the root pubic key stored in the root public key storage unit 523. The host/media authentication unit 542 generates a shared key as a result of the mutual authentication.

The encryption unit 543 generates the encrypted media unique key by encrypting the media unique key included in the media key generated by the decryption unit 541 through decryption with the shared key generated by the host/media authentication unit 542. The encryption unit 543 transmits the generated encrypted media unique key to the decryption unit 813 of the key distribution server 800.

The encrypted title key storage unit 550 receives the encrypted title key that is generated by the encryption unit 852 in the key distribution server 800 through encryption, and stores therein the received encrypted title key.

The individual encrypted media key storage unit 527 stores therein the individual encrypted media key.

The certificate storage unit 531 stores therein the media certificate.

<Flow of Key Issuing Operations Performed Between the Key Distribution Server 800 and the Storage Medium Device 500>

Figure 15:
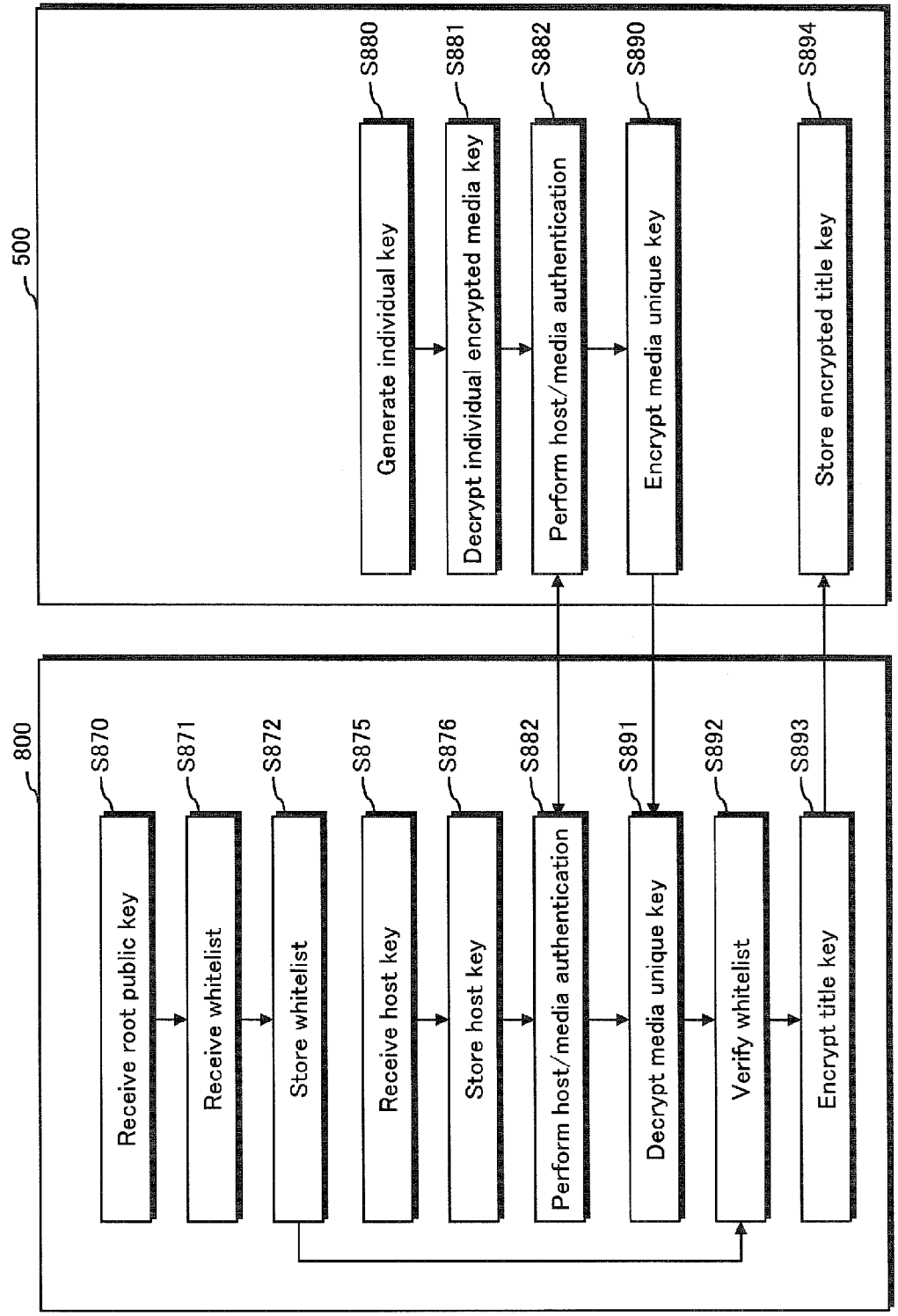
FIG. 15 is a flow chart showing operation at the time of distributing a key in Embodiment 1 of the present invention.

FIG. 15 shows a flow of key issuing operations performed between the key distribution server 800 and the storage medium device 500.

The key distribution server 800 receives the root public key from the key distribution center 100 (S870). The key distribution server 800 receives the whitelist from the whitelist distribution center 700 (S871). The key distribution server 800 stores the received whitelist (S872). The key distribution server 800 receives the host device private key and the host certificate of the host device public key from the key distribution center 100 (S875). The key distribution server 800 stores the host device private key and the host certificate of the host device public key (S876).

It is preferable that the procedures described above have been completed before the receipt of the title key acquisition request from the recording device or the playback device.

The storage medium device 500 generates the individual key with use of the controller key and the controller unique number (S880). The storage medium device 500 obtains the media key by decrypting the individual encrypted media key with the generated individual key (S881). The key distribution server 800 and the storage medium device 500 perform host/media mutual authentication, and obtain the shared key (S882). The storage medium device 500 generates the encrypted media unique key by encrypting the media unique key included in the media key already having been obtained with the shared key generated through the mutual authentication (S890). The key distribution server 800 receives the encrypted media unique key from the storage medium device 500, and obtains the media unique key by decrypting the received encrypted media unique key with the shared key generated through the mutual authentication (S891). The key distribution server 800 verifies whether the obtained media unique key is registered in the whitelist already having been received (S892). When the media unique key is registered in the whitelist, the key distribution server 800 permits title key encrypting processing, whereas, when the media unique key is not registered in the whitelist, the key distribution server 800 does not permits the title key encrypting processing. The key distribution server 800 generates the encrypted title key by encrypting the title key used for encryption and decryption of contents with the media unique key (S893). The storage medium device 500 receives the generated encrypted title key from the key distribution server 800, and stores the received encrypted title key (S894).

Embodiment 2

<Overall Configuration>

Figure 16:
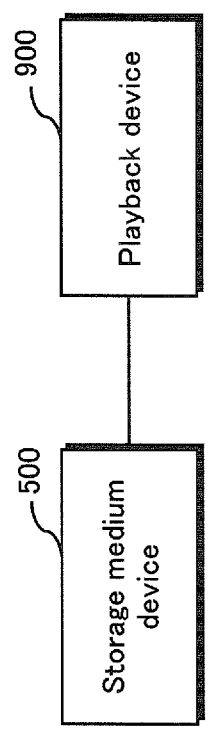
FIG. 16 shows overall configuration of a storage medium device 500 and a playback device 900 in Embodiment 2 of the present invention.

FIG. 16 shows configuration of a playback system of the storage medium device in Embodiment 2 of the present invention. The playback system of the storage medium device includes the storage medium device 500 and the playback device 900.

<Detailed Configuration of the Storage Medium Device 500 and the Playback Device 900>

Figure 17:
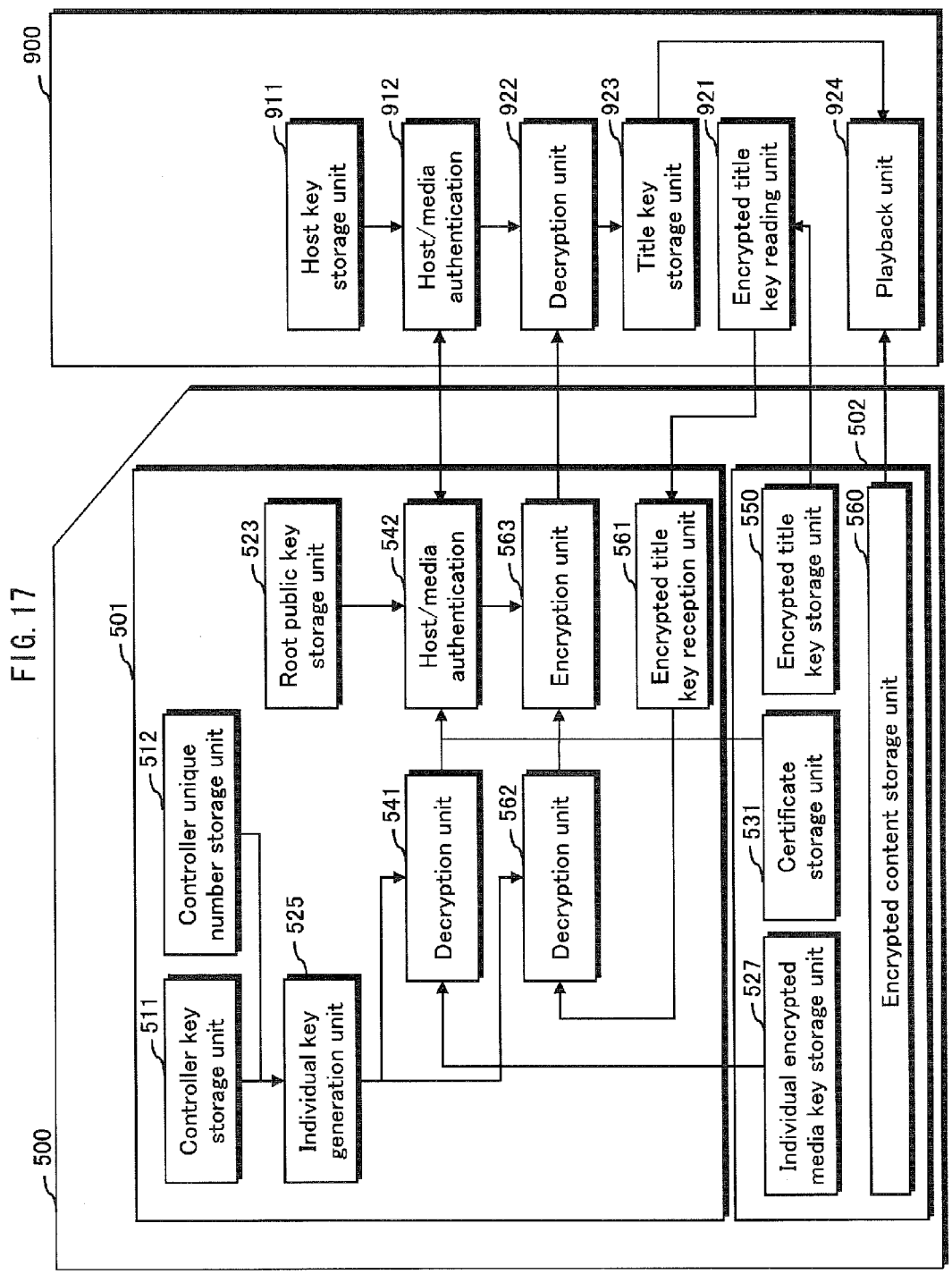
FIG. 17 shows overall configuration of the storage medium device 500 and the playback device 900 in Embodiment 2 of the present invention.

FIG. 17 shows detailed configuration of the storage medium device 500 and the playback device 900.

The storage medium device 500 includes the controller 501 and the flash memory 502. The controller 501 includes a controller key storage unit 511, a controller unique number storage unit 512, a root public key storage unit 523, an individual key generation unit 525, a decryption unit 541, a host/media authentication unit 542, an encrypted title key reception unit 561, a decryption unit 562 and an encryption unit 563. The flash memory 502 includes an individual encrypted media key storage unit 527, a certificate storage unit 531, an encrypted title key storage unit 550 and an encrypted content storage unit 560.

On the other hand, the playback device 900 includes a host key storage unit 911, a host/media authentication unit 912, an encrypted title key reading unit 921, a decryption unit 922, a title key storage unit 923, and a playback unit 924.

The controller 501 is an LSI device. Processing performed inside the controller 501 is securely protected, and a value cannot be read out from outside. The flash memory 502 is a storage device.

The controller key storage unit 511 stores therein the controller keys. Controller keys in the same lot have the same value that is unique to each lot.

The controller unique number storage unit 512 stores therein the controller unique numbers. Each controller unique number has a unique value.

The root public key storage unit 523 stores therein the root public key.

The individual key generation unit 525 generates the individual key that is unique to the controller 501 and cannot be obtained from the outside of the controller 501 with use of (i) the controller key stored in the controller key storage unit 511 and (ii) the controller unique number stored in the controller unique number storage unit 512.

The decryption unit 541 generates the media key by decrypting the individual encrypted media key stored in the individual encrypted media key storage unit 527 with the individual key generated by the individual key generation unit 525. Note that, since being processed only in the controller 501, the media key generated through decryption cannot be read out from the outside of the controller 501.

The host/media authentication unit 542 performs mutual authentication with the host/media authentication unit 912 of the key distribution server 800 with use of (i) the media device private key that is included in the media key decrypted by the decryption unit 541, (ii) the media certificate stored in the certificate storage unit 531, and (iii) the root pubic key stored in the root public key storage unit 523. The host/media authentication unit 542 generates a shared key as a result of the mutual authentication.

The encrypted title key reception unit 561 receives the encrypted title key from the playback device 900.

The decryption unit 562 obtains the title key by decrypting the encrypted title key received from the playback device 900, by using the individual key generated by the individual key generation unit 525.

The encryption unit 563 generates a shared key encrypted title key by encrypting the obtained title key with the shared key generated by the host/media authentication 542.

The individual encrypted media key storage unit 527 stores therein the individual encrypted media key.

The certificate storage unit 531 stores therein the media certificate.

The encrypted title key storage unit 550 stores therein the encrypted title key.

The encrypted content storage unit 560 stores therein an encrypted content written by the recording device, which is not depicted. The encrypted content is a digital content encrypted with the title key.

The host key storage unit 911 stores therein the host device private key and the host certificate of the host device public key that are securely received from the key distribution center 100.

The host/media authentication 912 performs mutual authentication with the host/media authentication unit 542 of the controller 501 with use of the host device private key and the host certificate of the host device public key that are stored in the host key storage unit 911 to generate a shared key.

The encrypted title key reading unit 921 reads out the encrypted title key that is stored in the encrypted title key storage unit 550 of the flash memory 502, and transmits the read encrypted title key to the controller 501 and requests the controller 501 to decrypt the encrypted title key.

The decryption unit 922 decrypts the shared key encrypted title key received from the controller 501 by using the shared key generated by the host/media authentication unit 912, thereby obtaining the title key.

The title key storage unit 923 stores therein the title key obtained by the decryption unit 922.

The playback unit 924 reads the encrypted content from the encrypted content storage unit 560 of the flash memory 502, and decrypts the read encrypted content by using the title key stored in the title key storage unit 923. The playback unit 924 plays back the decrypted digital content.

<Flow of Playback Operations Performed Between the Storage Medium Device 500 and the Playback Device 900>

Figure 18:
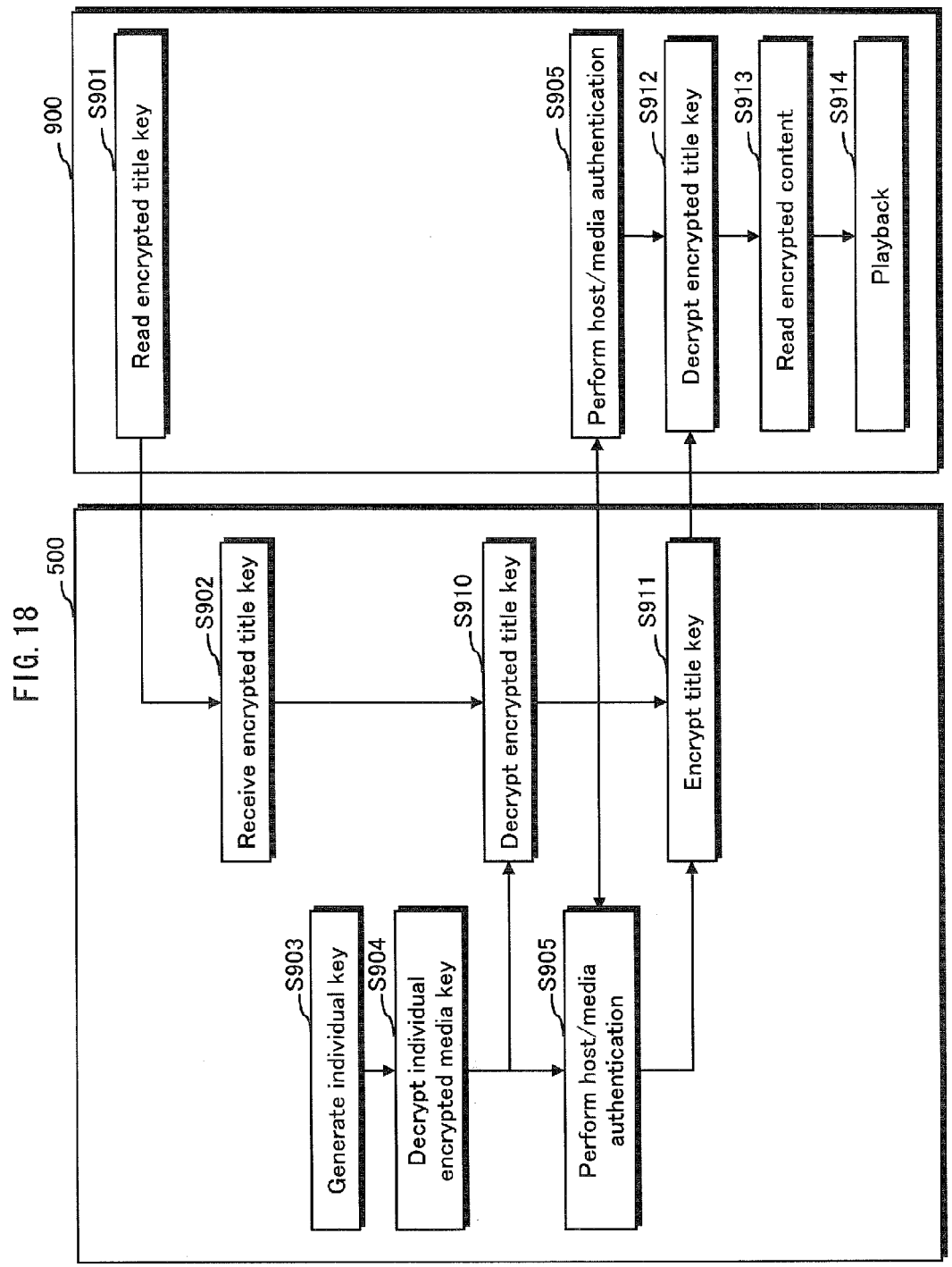
FIG. 18 is a flow chart showing operation during playback in Embodiment 2 of the present invention.

FIG. 18 shows a flow of playback operations performed between the storage medium device 500 and the playback device 900.

The playback device 900 reads out the encrypted title key stored in the encrypted title key storage unit 550 of the flash memory 502, and requests the controller 501 to decrypt the encrypted content key (S901).

The storage medium device 500 receives, from the playback device 900, the encrypted title key and the request to decrypt the encrypted title key (S902).

The storage medium device 500 generates the individual key (S903).

The storage medium device 500 obtains the media key by decrypting the individual encrypted media key with the generated individual key (S904).

The storage medium device 500 and the playback device 900 perform host/media mutual authentication, and generate the shared key (S905).

The storage medium device 500 decrypts the encrypted title key with the media unique key included in the media key to obtain the title key (S910).

The storage medium device 500 generates the shared key encrypted title key by encrypting the title key with the shared key generated through the mutual authentication (S911).

The playback device 900 receives the shared key encrypted title key from the storage medium device 500, and obtains the title key by decrypting the received shared key encrypted title key with the shared key generated through the mutual authentication. The playback device 900 stores therein the title key (S912).

The playback device 900 reads the encrypted content from the storage medium device 500 (S913).

The playback device 900 decrypts the read encrypted content by using the title key, thereby generating a digital content, and plays back the generated digital content (S914).

<Modifications>

(1) Although the Embodiments above are based on the authentication according to the public key cryptosystem with use of a key pair consisting of a private key and a public key is used as key information, a Media Key Block (MKB) technology or other authentication technologies using other encryption methods may be used.

(2) The Embodiments above are based on the use of, as a storage medium device, a memory card, such as an SD card, that includes a controller (i.e. a controller LSI) and a flash memory. However the present invention is not limited to the use of such a memory card. A device that has a structure in which a control LSI is incorporated into a storage device such as an HDD may be used. Instead of a removable memory card, a device that has a structure in which the control LSI is incorporated into a memory device housed in a mobile phone, an e-Book, and a NetBook may be used.

(3) Each of the Embodiments above has a structure in which the controller 501 once decrypts the encrypted media key by using the controller key, and then re-encrypts it by using the individual key. However, this is only an example. The structure of the present invention is not limited to this. For example, the controller 501 may further encrypt the encrypted media key by using the individual key, thereby generating the individual encrypted media key. Alternatively, the encrypted media key may be converted by calculation other than encryption. In other words, the controller 501 pertaining to the present invention is only required to include a conversion unit configured to convert the encrypted media key into data that is unique to the controller, by using unique information of the controller.

(4) In the Embodiments above, each of the key distribution center 100, the controller manufacturer 200, the authentication software vendor 300, the media assembler 400 and the whitelist distribution center 700 represents a device. Each device is a computer system that includes hardware such as a processor, a ROM, a RAM and a hard disk unit.

The ROM or the hard disk unit in each device stores thereon a computer program. The processor may realize each function of the Embodiments described above by executing the computer program while using the RAM.

(5) Regarding the Embodiments above, the storage medium device 500 is depicted in FIGS. 8, 9, 14 and 17. For the sake of simplicity, each drawing shows only the functions that are necessary for the explanation of the corresponding description. In reality, a single memory card that has all the functions shown in the drawings is manufactured.

Figure 19:
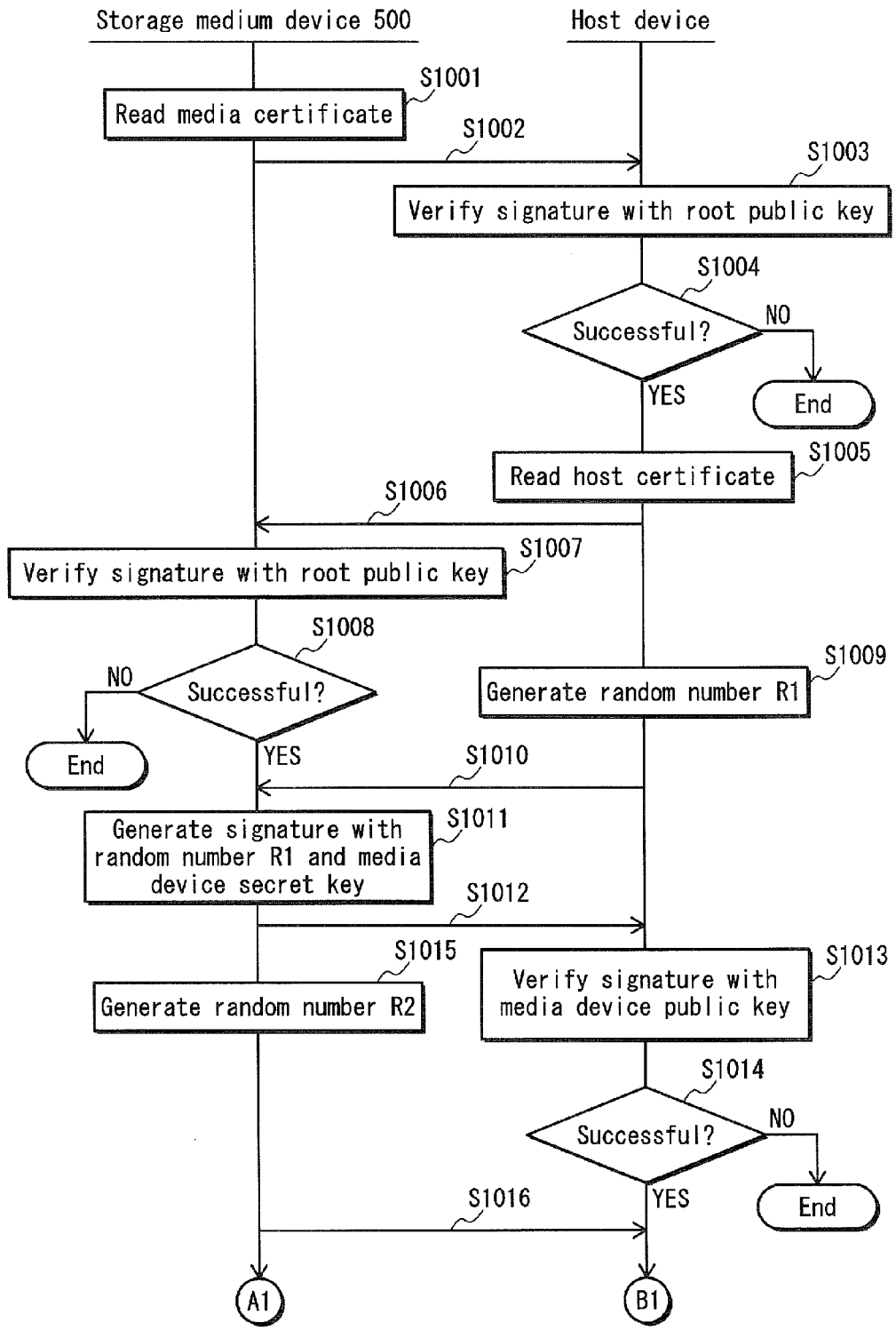
FIG. 19 is a flow chart showing the details of the mutual authentication pertaining to Embodiments 1 and 2 of the present invention.
Figure 20:
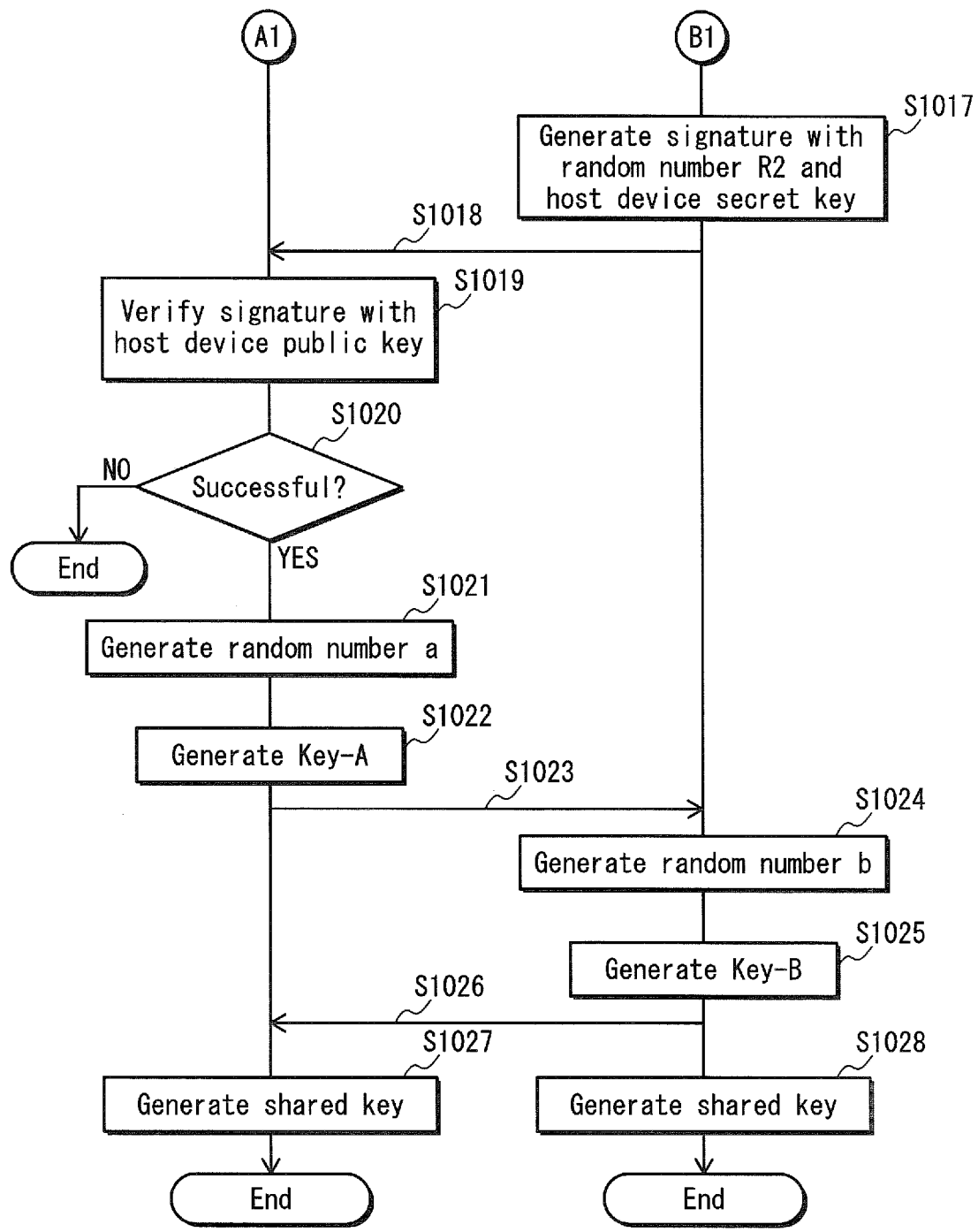
FIG. 20 is a flow chart showing the details of the mutual authentication pertaining to Embodiments 1 and 2 of the present invention.

(6) This section describes the details of the mutual authentication, with reference to the flow charts shown in FIG. 19 and FIG. 20.

The mutual authentication is performed between the controller 501 of the storage medium device 500 and the host device. In the Embodiments above, the authentication software 600 (in FIG. 9) operating in the device belonging to the media assembler 400, the key distribution server 800 (in FIG. 14), and the playback device 900 (in FIG. 17) may serve as the host device.

Thus, specifically, the operations described in this section are performed (i) between the host/media authentication unit 542 of the controller 501 and the host/media authentication unit 611 of the authentication software 600, (ii) between the host/media authentication unit 542 of the controller 501 and the host/media authentication unit 812 of the key distribution server 800, and (iii) between the host/media authentication unit 542 of the controller 501 and the host/media authentication unit 912 of the playback device 900.

In the following explanation of FIGS. 19 and 20, Gen( ) denotes a key generation function, and Y denotes a parameter that is unique to the system. The key generation function satisfies Gen(x, Gen(Y,z))=Gen(Y,Gen(x,z)). Note that the key generation function is not described in detail here, because it can be realized with any relevant well-known technology, such as a public key distribution method according to the Diffie-Hellman (DH) key exchange.

The host/media authentication unit 524 of the controller 501 reads the media certificate from the certificate storage unit 531 (S1001), and sends the media certificate to the host device (S1002). The host/media authentication unit of the host device performs signature verification on the signature data contained in the received media certificate, by applying a signature verification algorithm to the signature data by using the root public key as the public key of the key distribution center 100 (S1003). If the signature verification is unsuccessful (NO in Step S1004), the host device ends the processing. If the signature verification is successful (YES in S1004), the host/media authentication unit reads the host certificate (S1005), and transmits the host certificate to the controller 501 (S1006).

The host/media authentication unit 524 performs signature verification on the signature data contained in the received host certificate, by applying a signature verification algorithm to the signature data by using the root public key (S1007). If the signature verification is unsuccessful (NO in Step S1008), the controller 501 ends the processing. If the signature verification is successful (YES in S1008), the host/media authentication unit 524 moves to Step S1011.

The host/media authentication unit of the host device, which has transmitted the host certificate in Step S1006, generates a random number R1 (S1009), and transmits the generated random number R1 to the host/media authentication unit 524 (S1010).

The host/media authentication unit 524 generates signature data by applying a signature generation algorithm to the received random number R1 by using the media device secret key (S1011). The host/media authentication unit 524 generates the generated signature data to the host device (S1012).

The host/media authentication unit of the host device performs signature verification on the received signature data, by applying a signature verification algorithm to the signature data by using the media device public key contained in the media certificate (S1013). If the signature verification is unsuccessful (NO in Step S1014), the host device ends the processing. If the signature verification is successful (YES in S1014), the host device moves to Step S1017.

The host/media authentication unit 524, which has transmitted the signature data to the host device in Step S1012, generates a random number R2 (S1015), and transmits the generated random number R2 to the host device (S1016).

The host/media authentication unit of the host device generates signature data by applying a signature generation algorithm to the received random number R2 by using the host device secret key (S1017). The host/media authentication unit transmits the generated signature data to the controller 501 (S1018).

The host/media authentication unit 524 of the controller 501 performs signature verification on the received signature data, by applying a signature verification algorithm to the signature data by using the host device public key contained in the host certificate (S1019). If the signature verification is unsuccessful (NO in Step S1020), the controller 501 ends the processing. If the signature verification is successful (YES in S1020), the host/media authentication unit 524 generates a random number a (S1021). Furthermore, the host/media authentication unit 524 generates Key-A=Gen(a,Y) by using the generated random number a (Step S1022), and transmits the generated Key-A to the host device (S1023).

On receipt of the Key-A, the host/media authentication unit of the host device generates a random number b (S1024). The host/media authentication unit then generates Key-B=Gen(b, Y) by using the generated random number b (S1025), and transmits the generated Key-B to the controller 501 (S1026).

On receipt of the Key-B from the host device, the host/media authentication unit 524 of the controller 501 generates a shared key Gen(a,Key-B)=Gen(a,Gen(b,Y)) from the random number a generated in Step S1021 and the received Key-B (S1027).

Meanwhile, the host/media authentication unit of the host device generates a shared key Gen(b,Key-A)=Gen(b,Gen(a, Y)) by using the Key-A received from the controller 501 and the random number b generated in Step S1024 (S1028).

(7) In the Embodiments above, the key distribution center 100 has a structure for generating a partial media ID, which is at least a part of the media ID. In the case where a 128-bit media ID is required, the key distribution center 100 may generate 64 bits of the 128-bit media ID, as the partial media ID. If this is the case the remaining 64 bits may be generated within the controller 501, or generated by the media assembler 400.

When requested the media ID by a recording device for recoding data on the storage medium device 500 and a playback device for playing back the data recorded on the storage medium device 500, the controller 501 may output the media ID, including the partial media ID generated by the key distribution center 100, to the recording device and the playback device.

The key distribution center 100 of the present invention may generate the whole media ID, instead of only part of the media ID.

(8) According to the Embodiments above, the whitelist distribution center 700 manages the whitelist which contains the unique numbers of the authorized controllers. The use of the whitelist prevents the title key from being distributed to unauthorized controllers (i.e. the same key is embedded in a plurality of storage medium devices). However, it is not essential for the present invention to use the whitelist. Alternatively, the present invention may use a blacklist that contains unique numbers of unauthorized controllers.

(9) The controller of the present invention may have the following structure:

A controller to be incorporated in a storage medium device and controlling access to the storage medium device, the controller comprising a processor and a memory, the memory storing therein a computer program, the processor executing the program, thereby realizing: a holding unit configured to hold a controller key generated by a controller manufacturing device; a receiving unit configured to receive encrypted key information generated by a key distribution center that is authorized, the encrypted key information generated through encryption of key information with use of the controller key, the key information used for protecting data stored on the storage medium device; and a conversion unit configured to perform conversion on the encrypted key information by using unique information of the controller, thereby generating individually-converted key information.

(10) Alternatively, the controller of the present invention may have the following structure:

A controller to be incorporated in a storage medium device and controlling access to the storage medium device, the controller comprising: a holding circuit configured to hold a controller key generated by a controller manufacturing device; a receiving circuit configured to receive encrypted key information generated by a key distribution center that is authorized, the encrypted key information generated through encryption of key information with use of the controller key, the key information used for protecting data stored on the storage medium device; and a conversion circuit configured to perform conversion on the encrypted key information by using unique information of the controller, thereby generating individually-converted key information.

Advantageous Effects of Embodiments

In the storage medium device of the present invention, unauthorized copying of the storage medium device is prevented by embedding the controller key and a part of a media ID in the controller.

Furthermore, when the key distribution center issues the key information (e.g. a media device private key and a media unique key) to be written to the storage medium device to the media assembler, the key information is encrypted with the controller key already having been embedded in the controller so that the encrypted key information can be decrypted only by using the controller in which the corresponding controller key is embedded. As a result, sharing of the key information among controllers that each have been manufactured using a different mask and have a different controller key can be prevented.

Additionally, when the same controller key that is manufactured by using the same mask is embedded in a plurality of controllers, after the key information encrypted by the controller key is written to the storage medium device, whether or not the key information is properly written to the storage medium device is verified by using the authentication software. In addition, after obtaining information showing a relationship between the media unique key and the controller unique number, a list of media unique keys (i.e. whitelist) is generated based on the obtained information. The whitelist is used when the key distribution server checks whether the storage medium device is an authorized device or unauthorized device to distribute the key to the storage medium device. With these effects, even if the controller has the same controller key manufactured by using the same mask, key distribution to the storage medium device to which the same key information has been written is stopped. Accordingly, the unauthorized use of the storage medium device can be prevented.

<Summary>

Assume that a card maker has stored the same media ID in a plurality of memory cards. That is to say, the same media ID has been stored in first and second memory cards by the card maker. In addition, in the first memory card, authorized encrypted contents have been stored. The encrypted contents have been generated by encrypting contents with a content key generated from the media ID.

In this case, assume that the encrypted contents having been stored in the first memory card are illicitly copied to the second memory card. In order to illicitly play back the encrypted contents copied to the second memory card, the media ID is obtained from the second memory card, and the content key is generated from the obtained media ID. Since the media ID stored in the second memory card is the same as that stored in the first memory card, the content key generated from the media ID obtained from the second memory card is the same as that generated from the media ID obtained from the first memory card. Accordingly, when an attempt is made to decrypt the encrypted contents copied to the second memory card with the generated content key, the decryption is successfully performed.

As seen from the above, with the conventional technology, there are cases where rights of copyright owners of digital contents cannot be protected when a card maker illicitly stores the same media ID in a plurality of memory cards.

The present invention has been achieved in view of the above problem, and aims to provide (i) a storage medium device that can prevent makers of the storage medium device from illicitly storing the same identifying information in a plurality of storage medium devices, and (ii) manufacturing procedures for the storage medium device.

In order to achieve the above aim, the present invention is a storage medium device used in a digital copyright protection system comprising a controller manufacturing device for manufacturing a controller to be assembled into the storage medium device, a key distribution center for issuing key information to be written to the storage medium device, and a media assembling device for assembling the storage medium device from the controller and a storage device, wherein the controller manufacturing device manufactures the controller in which a controller key is embedded, causes the key distribution center to register the controller key, and provides the manufactured controller to the media assembling device, the key distribution center generates the key information, and issues, to the media assembling device, encrypted key information that is obtained by encrypting the generated key information with the registered controller key, the media assembling device assembles the storage medium device from the controller provided by the controller manufacturing device and the storage device, and writes the encrypted key information issued by the key distribution center to the storage medium device, and when the encrypted key information is written to the storage medium device, the storage medium device decrypts the encrypted key information with the controller key embedded in the controller to obtain the key information, encrypts the obtained key information with an individual key that is unique to the controller to generate re-encrypted key information, and stores the re-encrypted key information in the storage device.

INDUSTRIAL APPLICABILITY

The present invention is applicable in industries in which storage medium devices such as SD cards are manufactured and sold and industries in which controllers to be incorporated into the storage medium devices are manufactured and sold, as a mechanism for protecting the copyrights on contents by preventing card makers from conducting unauthorized acts.

REFERENCE SIGNS LIST

100 key distribution center
200 controller manufacturer
300 authentication software vendor
400 media assembler
500 storage medium device
600 authentication software
700 whitelist distribution center
800 key distribution server
900 playback device

The invention claimed is:

1. A controller to be incorporated in a storage medium device and controlling access to the storage medium device, the controller comprising:
   a holding circuit configured to hold a controller key embedded by a controller manufacturing device;
   a receiving circuit configured to receive encrypted key information generated by a key issuance center that is authorized, the encrypted key information generated through encryption of key information with use of the controller key, the key information used for protecting data stored on the storage medium device; and a conversion circuit configured to perform conversion on the encrypted key information by using unique information of the controller, thereby generating individually-converted key information.

2. The controller of claim 1, wherein
the conversion circuit includes:
a decryption circuit configured to decrypt the encrypted key information by using the controller key held by the holding circuit, thereby generating the key information; and
an encryption circuit configured to encrypt the key information by using the unique information, thereby generating the individually-converted key information.

3. The controller of claim 2, wherein
the encrypted key information, which the receiving circuit receives from the key issuance center, is given a signature of the key issuance center, and
the controller includes:
an authentication circuit configured to verify the signature by using a public key of the key issuance center, and to cause the encryption circuit to stop generating the individually-converted key information when failing to verify the signature.

4. The controller of claim 3, wherein
the holding circuit is further configured to hold a controller unique number generated by the controller manufacturing device, and
the controller further comprises:
a calculation circuit configured to apply a given one-way function to the controller unique number.

5. A storage medium device including the controller defined in claim 1 and a storage device.

6. The storage medium device of claim 5, wherein
the controller further comprises:
a writing circuit configured to write the individually-converted key information generated by the conversion circuit into the storage device, and the storage device comprises:
a key storage circuit configured to store therein the individually-converted key information.

7. The storage medium device of claim 6, wherein
the storage device further comprises:
a certificate storage circuit configured to store therein a media certificate that includes a partial media ID generated by the key issuance center, at least part of the key information, and a signature of the key issuance center, the partial media ID being at least part of a media ID used for protecting data stored on the storage device.

8. The storage medium device of claim 7, wherein
the controller further comprises:
a mutual authentication circuit configured to perform mutual authentication by causing a host device to authenticate the controller by using the media certificate, and authenticating the host device by using a public key certificate of the host device, and
the controller performs processing together with the host device when the mutual authentication circuit successfully completes the mutual authentication.

9. The controller of claim 1, wherein
the encrypted key information, which the receiving circuit receives from the key issuance center, is given a signature of the key issuance center, and
the controller includes:
an authentication circuit configured to verify the signature by using a public key of the key issuance center, and to cause the conversion circuit to stop generating the individually-converted key information when failing to verify the signature.

10. A manufacturing system for manufacturing a storage medium device that includes a controller and a storage device, the manufacturing system comprising:
a controller manufacturing device configured to generate a controller key, to manufacture a controller in which the generated controller key is embedded, to provide a media assembling device with the generated controller key, and to transmit the controller key to a key issuance center;
the key issuance center that is authorized and is configured to generate key information used for protection of data stored on the storage medium device, to encrypt the key information by using the controller key to generate encrypted key information, and to issue the encrypted key information to the media assembling device; and
the media assembling device configured to assemble the storage medium device from the controller received from the controller manufacturing device and a storage device, and to input the encrypted key information to the controller, wherein the controller includes:
a holding circuit configured to hold the controller key;
a receiving circuit configured to receive the encrypted key information;
a conversion circuit configured to perform conversion on the encrypted key information by using unique information of the controller, thereby generating individually-converted key information; and
a writing circuit configured to write the individually-converted key information into the storage device.

11. The manufacturing system of claim 10, wherein
the media assembling device includes:
a verification circuit configured to receive key information pieces from a plurality of storage medium devices on which the key information pieces are stored in one-to-one correspondence, and to verify whether each storage medium device is assigned a different key information piece.

12. The manufacturing system of claim 10 further comprising:
a whitelist management device configured to manage a list of unique information pieces of controllers included in storage medium devices each verified as being assigned a different key information piece, wherein
the verification circuit transmits, to the whitelist management device, a unique information piece of a controller included in a storage medium device verified as being assigned a different key information piece.

13. The manufacturing system of claim 11 further comprising:
a key distribution server configured to store therein a title key used for encryption and decryption of data stored on the storage medium device, wherein
the key distribution server, on receipt from a controller of a title key transmission request including a unique information piece of the controller, determines whether the unique information piece is contained in the list managed by the whitelist management device, and transmits the title key to the controller when determining that the unique information piece is contained in the list.

14. A method for manufacturing a storage medium device including a controller and a storage device, the method comprising:
a controller manufacturing step in which a controller manufacturing device generates a controller key, manufactures a controller in which the generated controller key is embedded, provides a media assembling device with the generated controller key, and transmits the controller key to a key issuance center;

a key distribution step in which the key issuance center generates key information used for protection of data stored on the storage medium device, encrypts the key information by using the controller key to generate encrypted key information, and issues the encrypted key information to the media assembling device;

a media assembling step in which the media assembling device assembles the storage medium device from the controller received from the controller manufacturing device and a storage device, and inputs the encrypted key information to the controller;

a conversion step in which the controller performs conversion on the encrypted key information by using unique information of the controller, thereby generating individually-converted key information; and a writing step in which the controller writes the individually-converted key information into the storage device.

* * * * *